March 10, 1964  A. J. BURKE  3,124,206
WEIGHING SYSTEMS
Filed Feb. 15, 1962  12 Sheets-Sheet 1
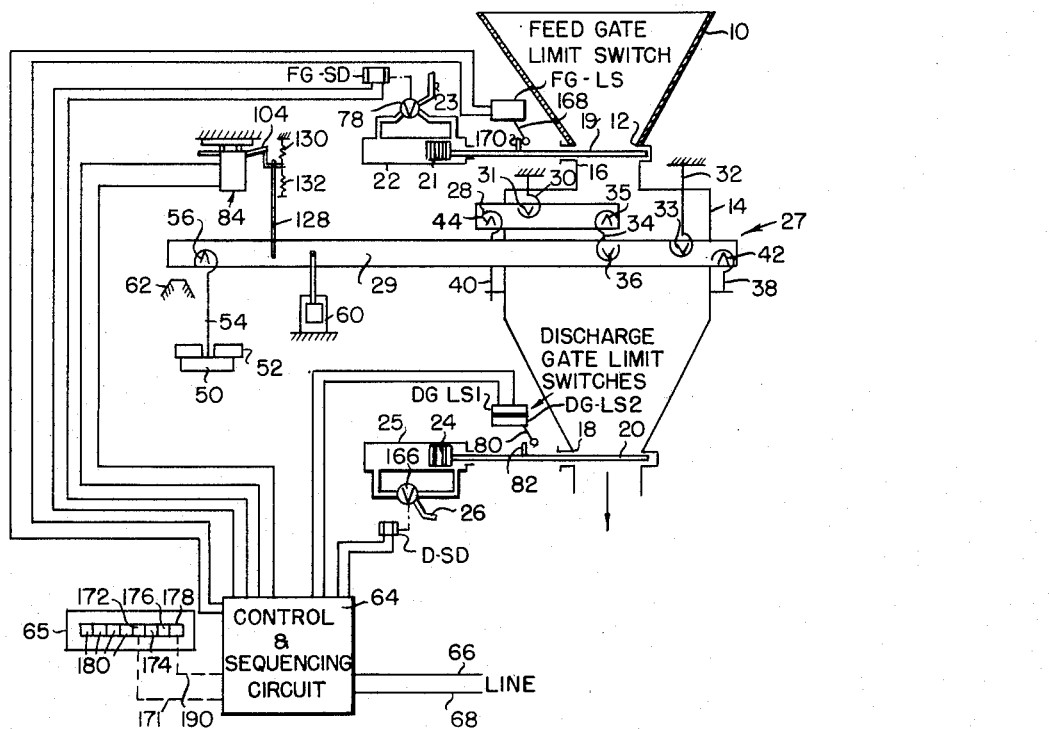
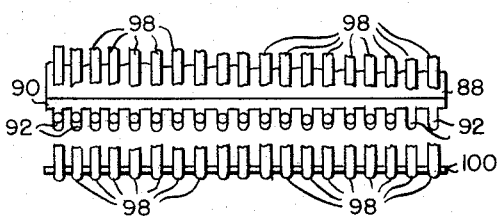
INVENTOR
Arthur J. Burke
BY
ATTORNEYS

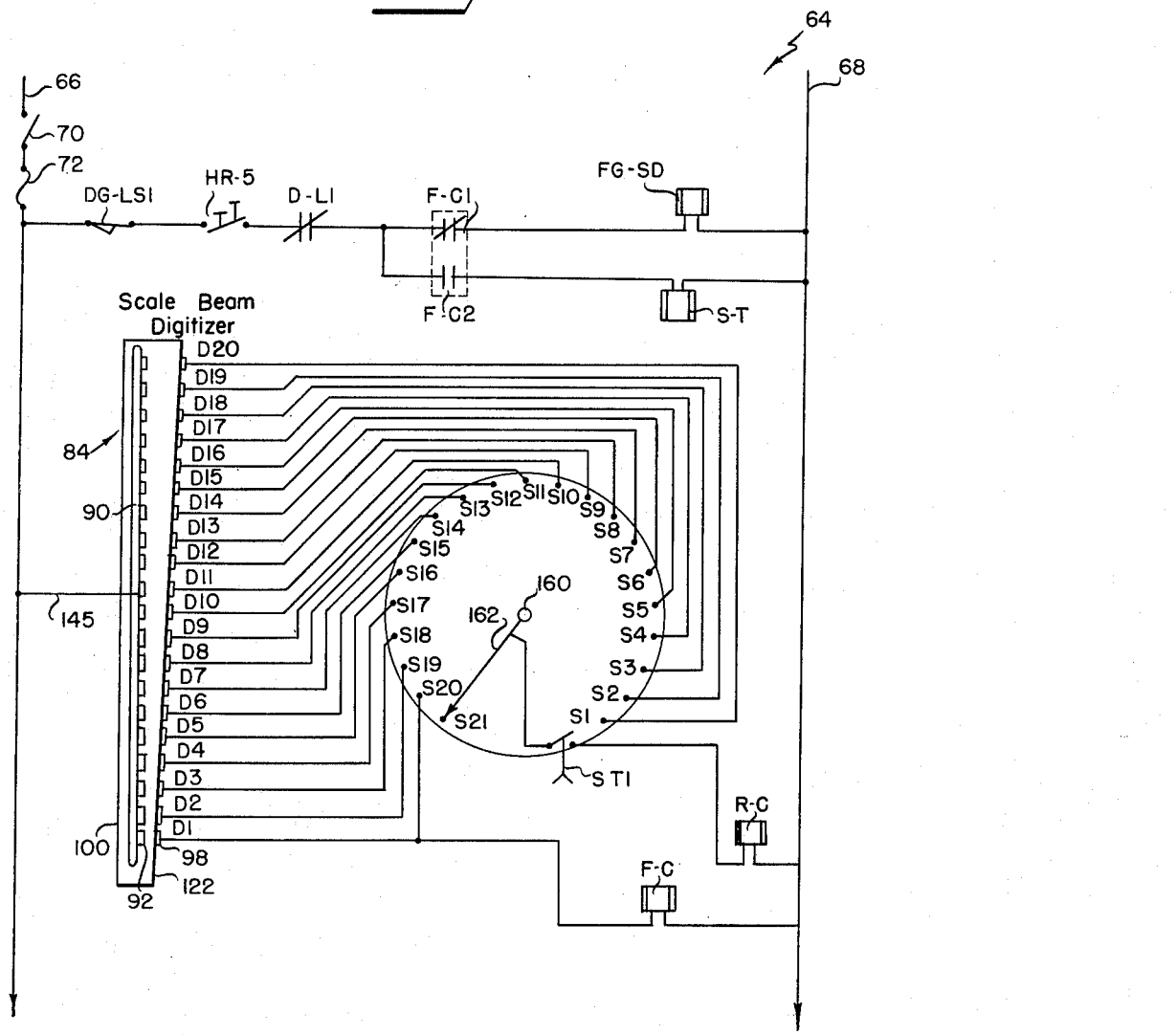

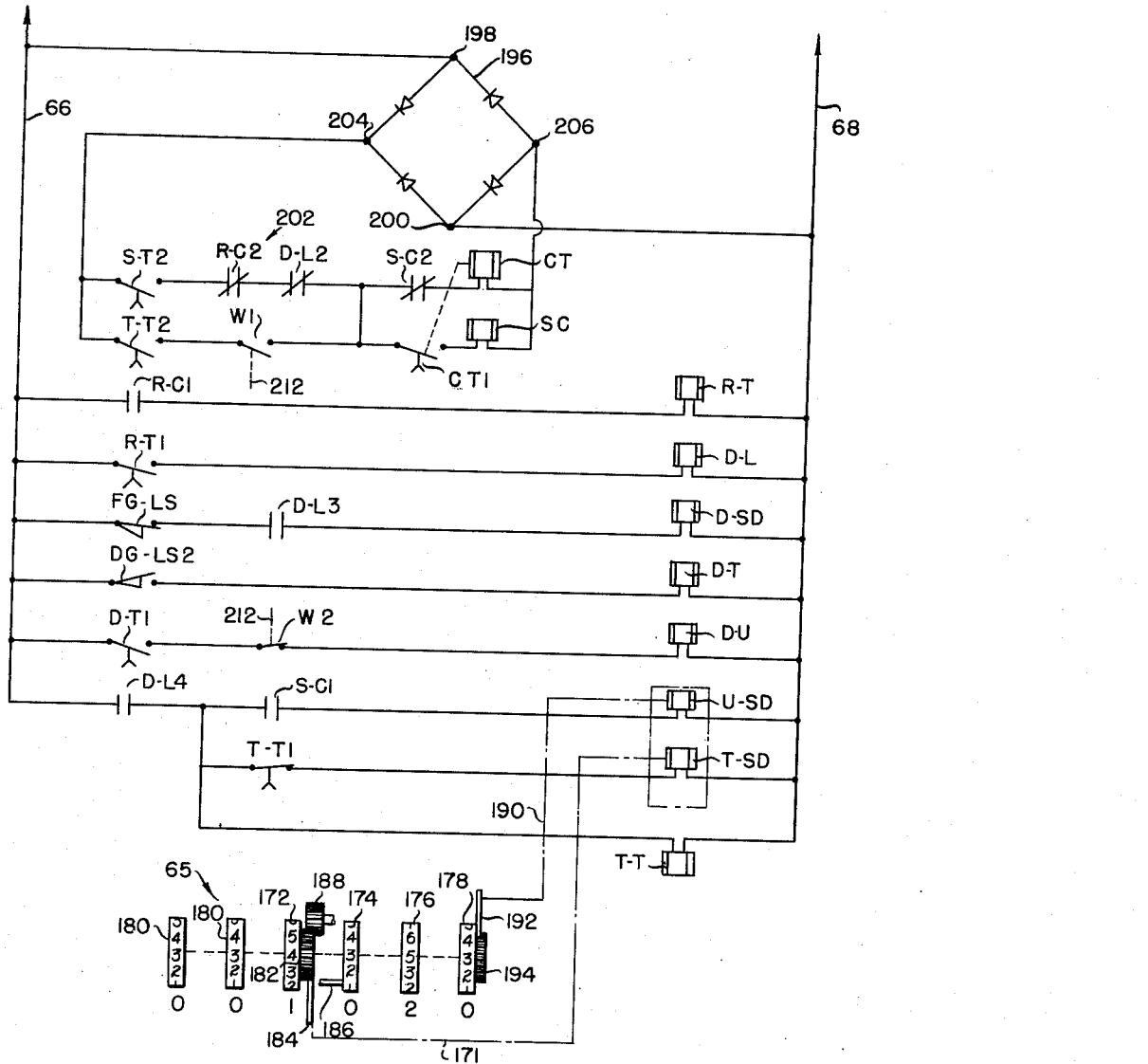

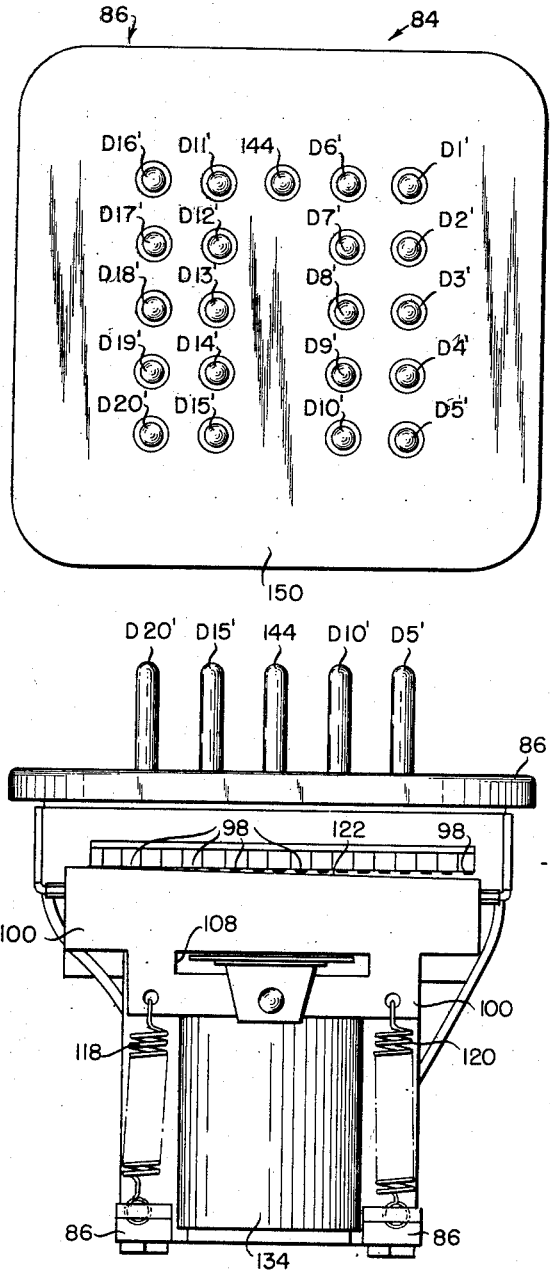

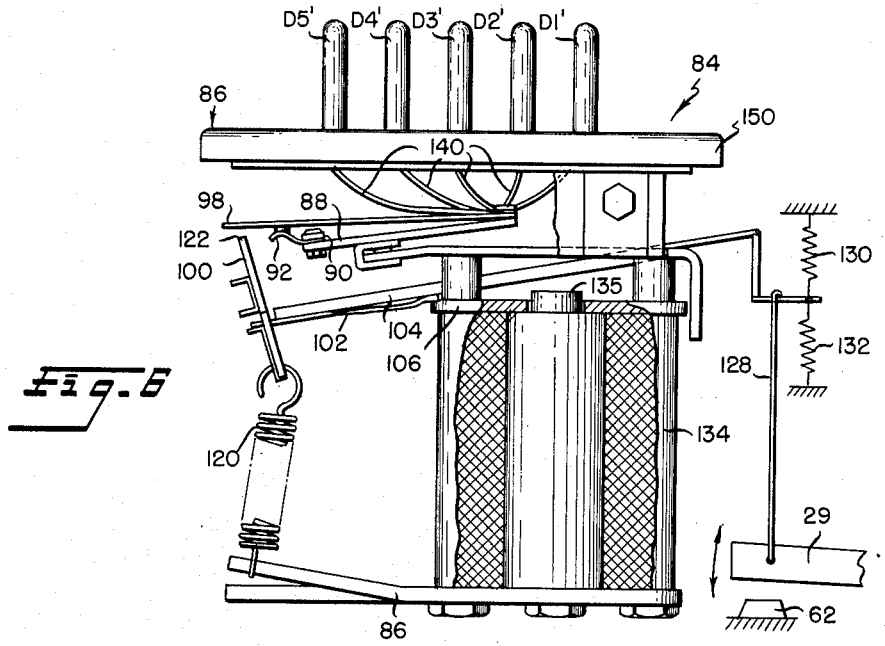
Fig. 6
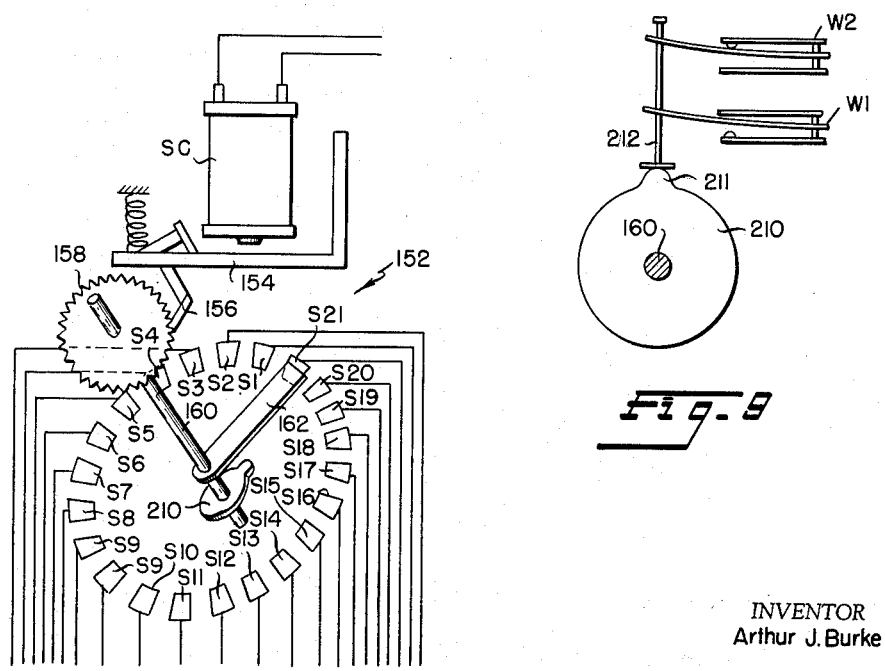
Fig. 7
Fig. 8
INVENTOR
Arthur J. Burke
BY
ATTORNEYS

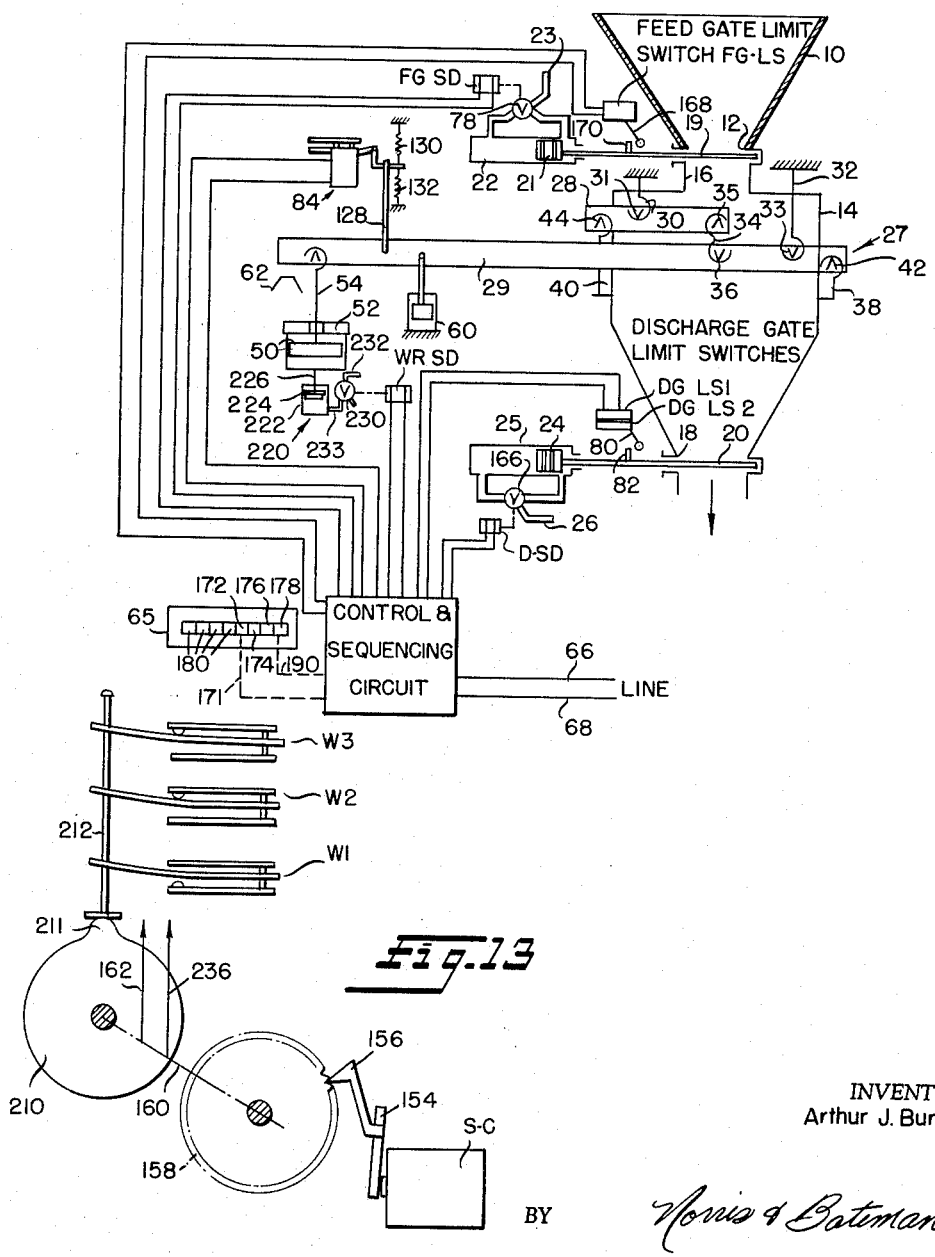

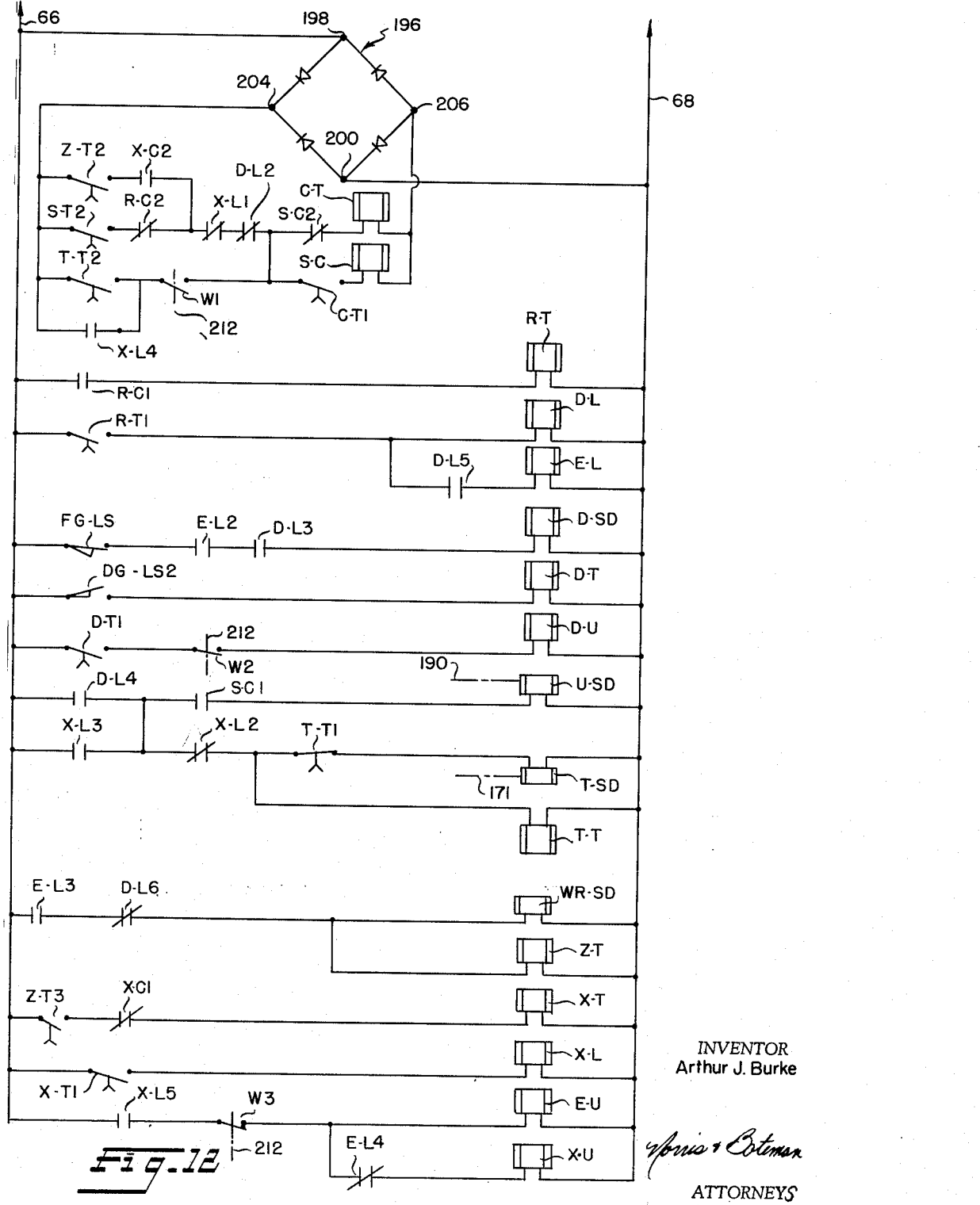

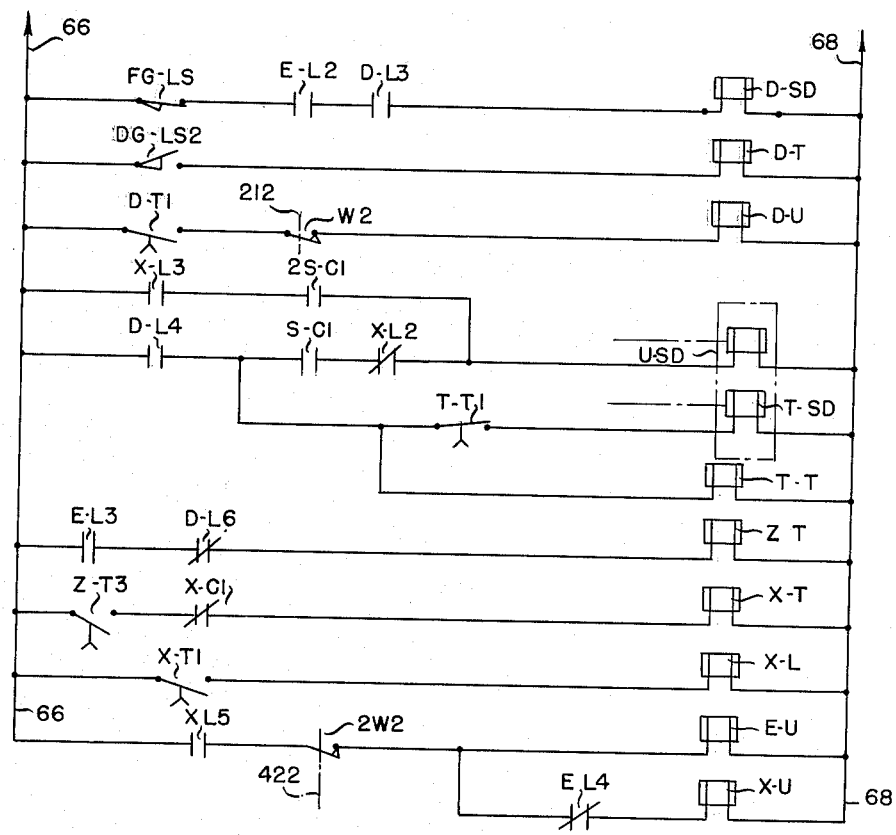
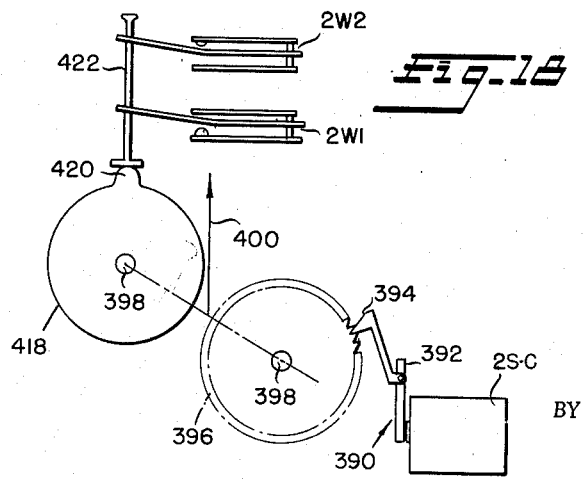

United States Patent Office 3,124,206
Patented Mar. 10, 1964

3,124,206
WEIGHING SYSTEMS
Arthur J. Burke, Oakland, N.J., assignor to Howe Richardson Scale Company, a corporation of Delaware
Filed Feb. 15, 1962, Ser. No. 173,538
28 Claims. (Cl. 177—46)

The present invention relates to improvements in weighing systems and more particularly to improvements in bulk weighing systems of the automatic scale hopper type in which successive drafts of predetermined weight value are automatically discharged and counted.

In weighing material removed from a bulk storage bin, it is the usual practice to withdraw the material from the bin in successive drafts of predetermined weight value since the capacity of the scale normally is appreciably less than the storage capacity of the bin. The drafts are customarily fed to a weigh hopper or other suitable load receiving element by gravitational flow and a weight control system, operatively associated with the hopper, automatically controls the operation of a feed gate or valve mechanism to interrupt the feed to the hopper when the load therein is balanced by the scale. Discharge of each draft from the hopper is automatically controlled and the numbers of successive drafts discharged from the hopper are counted to indicate the total weight of material withdrawn from the storage bin.

To accurately determine the total weight of material withdrawn from the storage bin in this manner, it is essential that the drafts have uniform known weights since only the number of drafts discharged from the hopper are counted. Consequently, due consideration has been given to additional material entering the hopper after a balanced scale condition has been secured. The introduction of this additional material into the hopper is due to the unavoidable delay in closing the feed gate after a draft of predetermined weight value has entered the hopper to balance the scale.

In the past, various systems have been employed which compensate for the weight of excess material entering the weigh hopper while the feed gate is closing. The compensation normally is achieved by estimating the expected weight deviation from a balanced scale condition. Thus, with these prior art weighing systems which in some manner compensate for the excess material, the registered or recorded weight represents the amount of material which is intended to be introduced into the weigh hopper and not the amount of material actually received by the hopper. Since there is no way to determine the actual weight of material received by the hopper with these systems, appreciable weighing errors attributable to compensating for the weight deviation go undetected.

Some attempts have been made to overcome the foregoing shortcomings of the prior art weighing systems but they generally involve expensive and complicated systems and usually require intricate power amplification networks in electrical control circuits to produce more accurate recordations of the weight of material discharged from the weigh hopper.

The present invention generally contemplates an unusually simplified automatic system by which the actual total weight of material introduced into the hopper is accurately determined and registered, thus eliminating weighing errors attributable to compensating for the deviation of weight from a balanced scale condition.

With the present invention, a nominal draft of uniform predetermined magnitude entering the weigh hopper balances a counterweight on the weighbeam from which the hopper is supported. Upon balancing the load in the hopper, the feed gate begins to close and a counting mechanism is actuated to automatically manifest a plural order number representative of the actual weight of the nominal draft at which the balanced condition was secured. Thereafter, as the excess material enters the hopper to cause an overbalance, the resulting deflection of the weighbeam is digitized by a simplified analog-to-digital converter unit connected directly to the weighbeam. This digitized overbalance is then added to the weight record, thus providing for an actual and extremely accurate indication of the total weight of material received in the hopper.

With those materials having a tendency to adhere to the walls of the weigh hopper, a further difficulty is encountered since a residue will be left in the hopper after the draft is discharged. Unless this residue is accounted for in some manner, the weight of the residue will be repeatedly added to the weight record with the registration of each subsequent draft. As a result, the amount of material which is registered will exceed the actual amount of material removed from storage.

In order to account for the residue, a post weighing may be made of the empty hopper after each draft is discharged to determine the weight of the residue. The weight value of the residue may then be subtracted from the weight value of the draft introduced into the hopper. The subtraction of the residue, however, gives rise to certain complications in effectively and simply registering the weight of material discharged from the hopper and also in accumulating the total weight values of multiple drafts.

To overcome the foregoing difficulties, the present invention further contemplates a simplified automatic system which accurately provides for the registration of the actual amount of material discharged from the weigh hopper without requiring the subtraction of the residue from the total weight of the draft introduced into the hopper.

Accordingly, the primary object of the present invention resides in the provision of a novel simplified weighing system for automatically and accurately weighing successive drafts of material removed from bulk storage.

A further object of the present invention resides in the provision of an automatic weighing system in which any overbalance is detected and added to the weight value of the load at which a balanced scale condition is secured.

Still another object of the present invention resides in the provision of a novel bulk weighing system for cyclically automatically feeding, weighing and discharging successive drafts with the actual weight of each draft being automatically added to a weight record in a manner to facilitate a savings in time required for processing each draft.

A more specific object of the present invention resides in the provision of a novel automatic weighing system of the scale hopper type in which the predetermined weight values of successively discharged nominal drafts securing balanced scale conditions are added to the weight record as single counts and in which any overbalance is digitized by a simplified analog-to-digital converter unit connected directly to the scale beam with the digitized overbalance being added to the weight record independently of the entries of the nominal drafts and concomitantly with the discharge of each draft.

Still a further object of the present invention resides in the provision of a novel weighing system of the automatic scale hopper type in which any residue left in the hopper is accounted for without necessitating the subtraction of the residue weight value from the weight record of the total amount of material introduced into the hopper, thus enabling the employment of a simplified type of counting mechanism which totalizes values transmitted thereto only by addition.

A further object of the present invention resides in the provision of a novel weighing system of the automatic scale hopper type in which the weight value of any residue left in the hopper is additively accounted for in a weight record of the accumulated total amount of material discharged from the hopper in successive drafts.

A more specific object of the present invention resides in the provision of an automatic bulk weighing system having a scale mechanism supporting a weigh hopper and including a weighbeam counterweighted to balance a predetermined weight of material fed to the weigh hopper with a digitizer connected directly to the weighbeam and being operable to establish a predetermined number of separate current paths corresponding to the weight value of any overbalance exceeding the predetermined weight at which a balanced scale condition is secured.

Further objects of the present invention will appear from the appended claims and as the description proceeds in connection with the annexed drawings wherein:

FIGURE 1 is a general schematic view illustrating an automatic bulk weighing system for weighing successive drafts of material of predetermined weight according to one embodiment of the present invention;

FIGURES 2 and 3 diagrammatically illustrate the electrical control and sequencing circuit shown in FIGURE 1 with FIGURE 3 being arranged beneath FIGURE 2 to complete the circuit diagram;

FIGURE 4 is a top plan view of the weighbeam digitizer illustrated in FIGURE 1;

FIGURE 5 is a front elevational view of the weighbeam digitizer illustrated in FIGURE 4;

FIGURE 6 is a right-hand side elevational view of the digitizer illustrated in FIGURE 4;

FIGURE 7 is a section taken substantially along line 7—7 of FIGURE 5;

FIGURE 8 is a diagrammatic view illustrating the stepping switch mechanism shown in FIGURES 2 and 3;

FIGURE 9 is a section taken substantially at right angles to the stepping switch wiper shaft illustrated in FIGURE 8 and showing cam actuated contacts W1 and W2 together with the cam and following mechanism for actuating contacts W1 and W2;

FIGURE 10 is a general schematic view illustrating an automatic bulk weighing system according to a further embodiment of the present invention in which the counterweight is automatically removable from the weighbeam to enable any residue left in the weigh hopper to be accounted for in determining the weight of material discharged from the weigh hopper;

Figure 11:
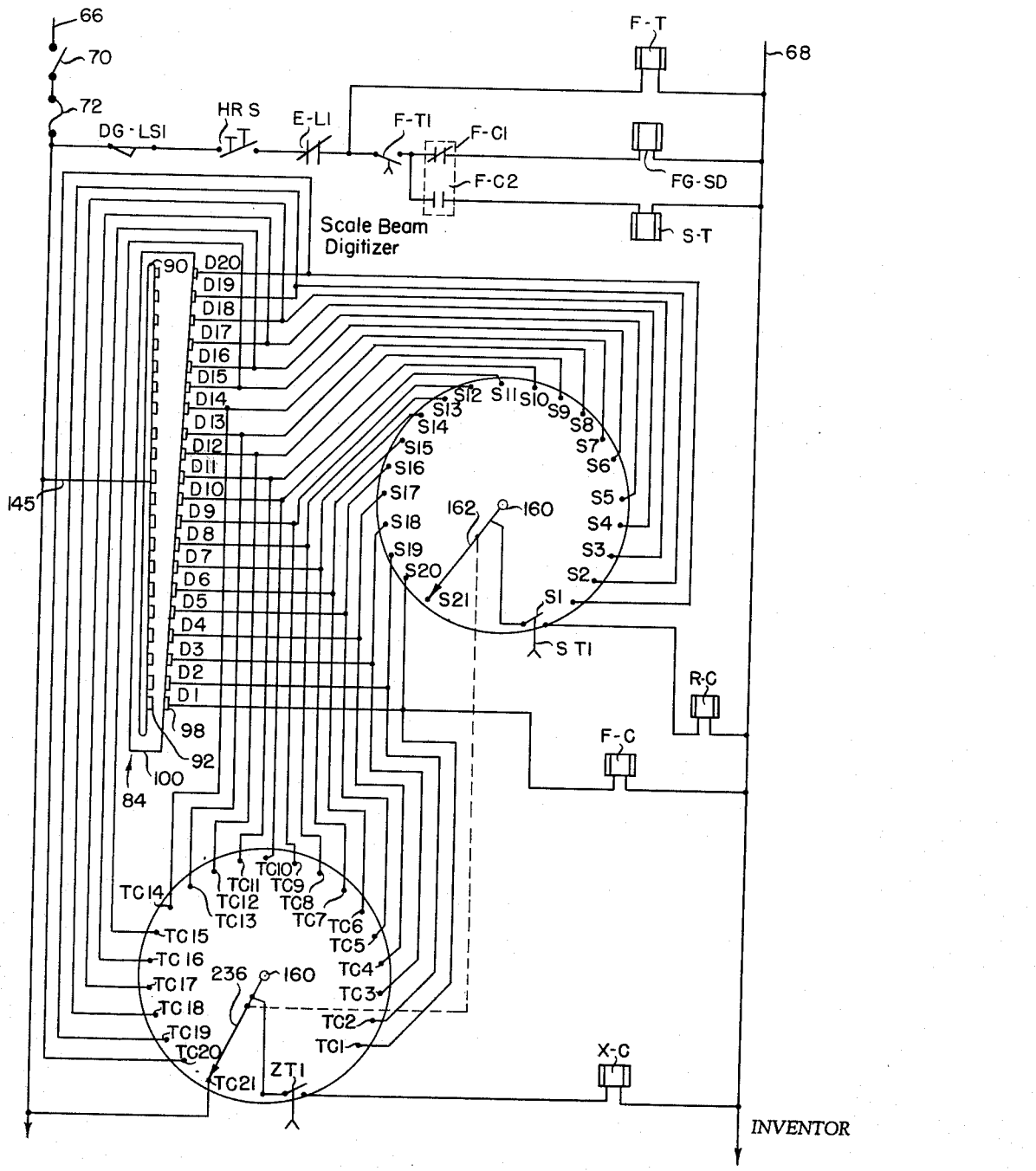
Figure 14:
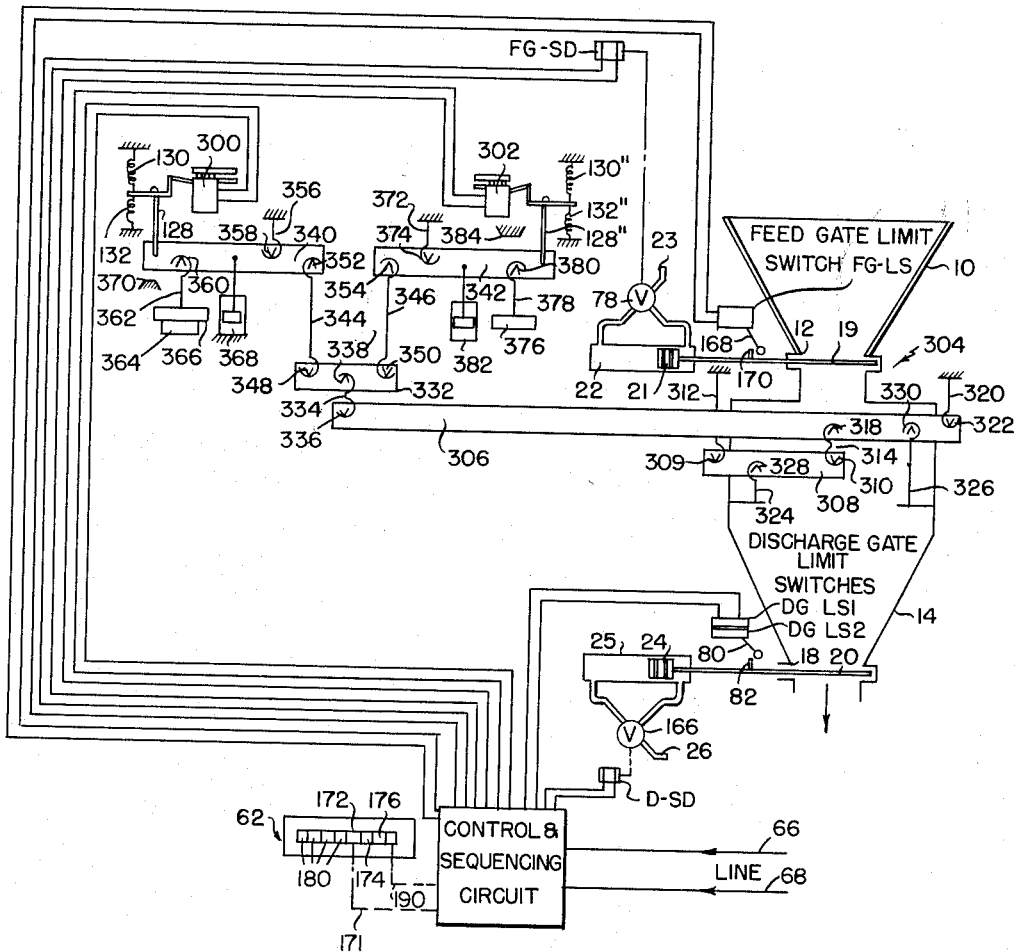
Figure 15:
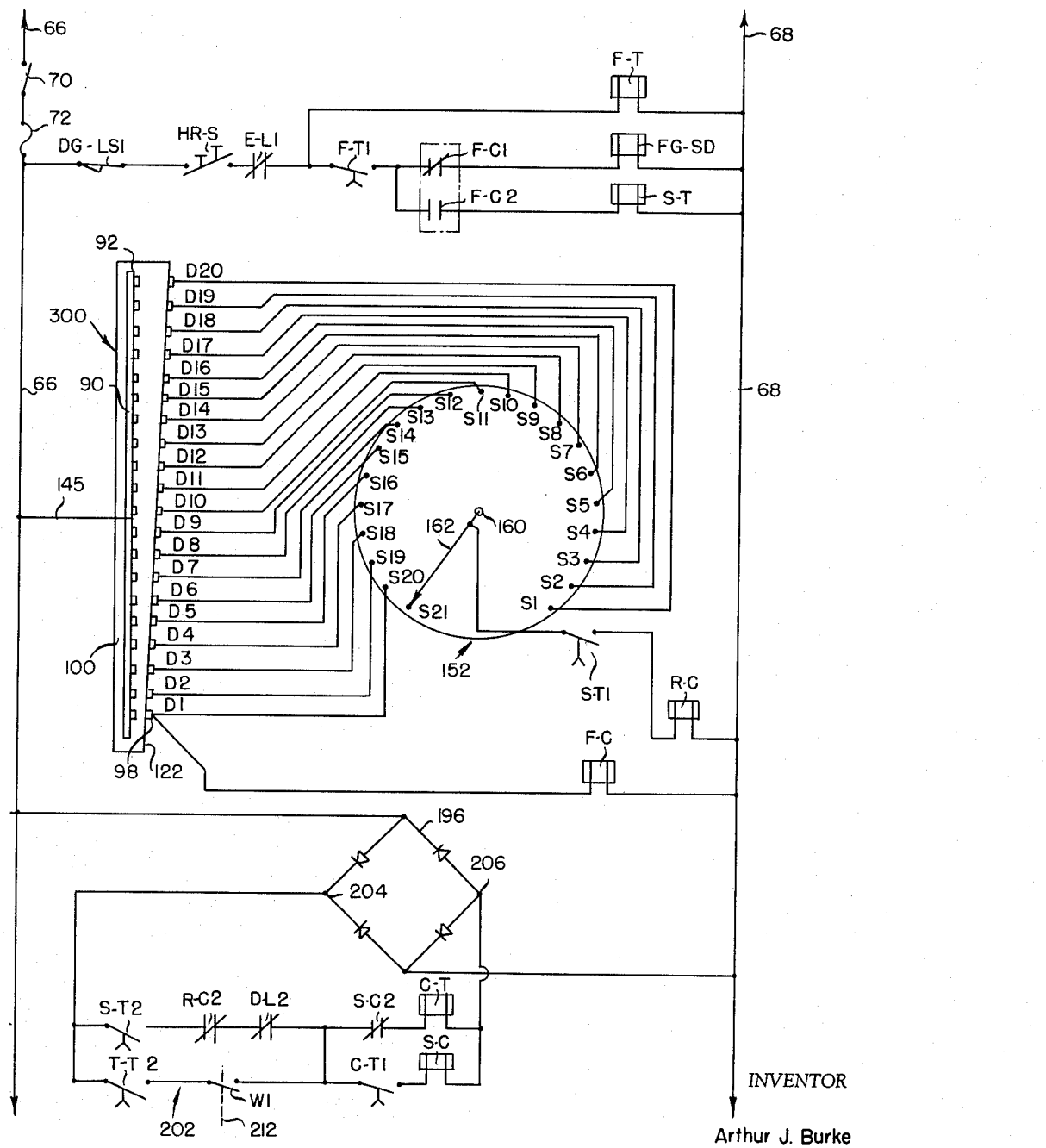
Figure 16:
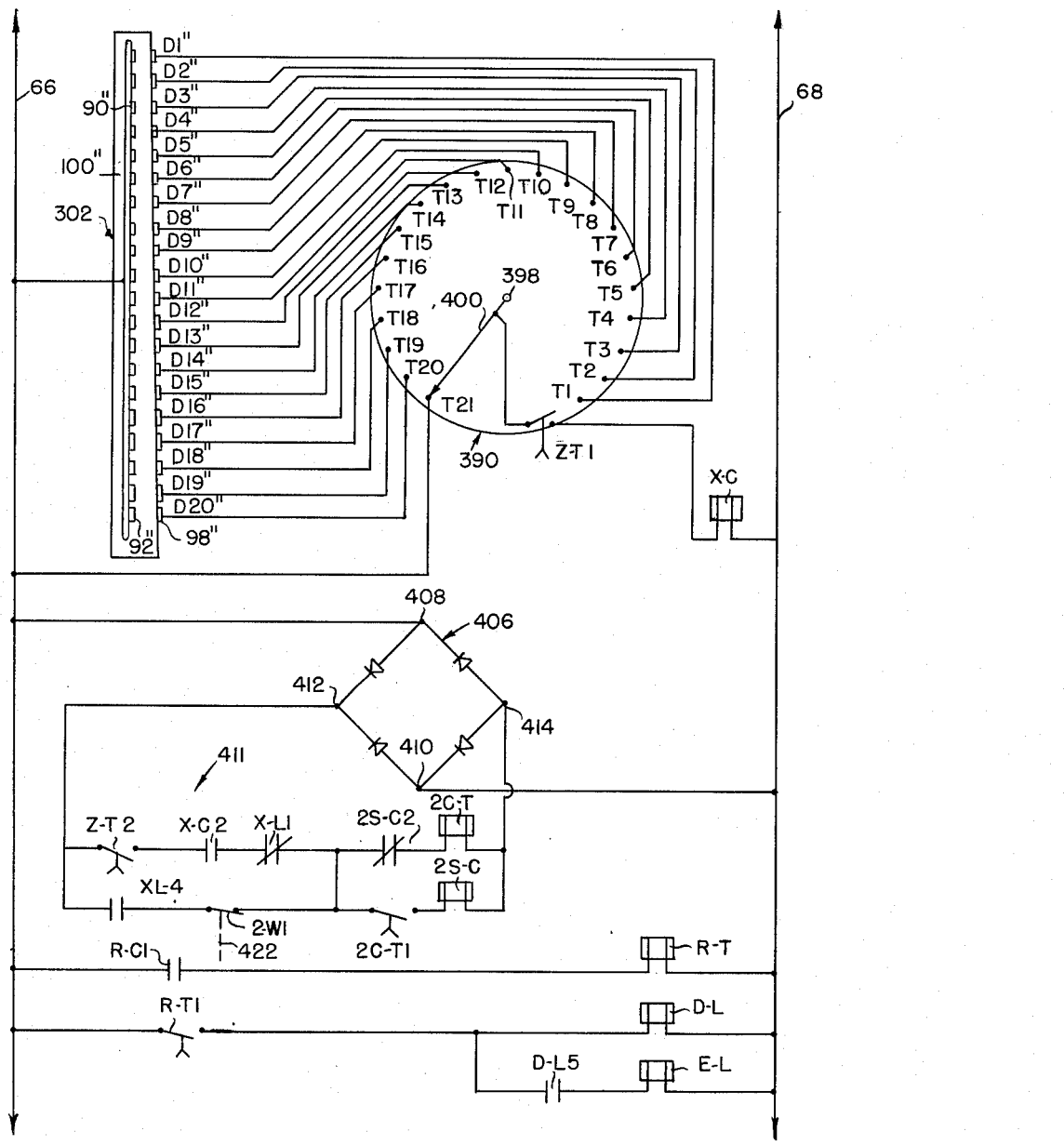

FIGURES 11 and 12 diagrammatically illustrate the electrical control and sequencing circuit shown in FIGURE 10, with FIGURE 12 being arranged beneath FIGURE 11 to complete the circuit diagram;

FIGURE 13 is a fragmentary perspective view illustrating the stepper switch mechanism shown in FIGURES 11 and 12 and further illustrating the cam actuated contacts W1, W2 and W3 together with the cam and following mechanism for actuating contacts W1, W2 and W3;

FIGURE 14 is a general schematic view illustrating an automatic bulk weighing system according to still another embodiment of the present invention in which two of the digitizers as shown in FIGURE 1 are employed with one of the digitizers arranged to detect and digitize any overbalance with a loaded weigh hopper and with the other digitizer arranged to detect and digitize any residue left in the weigh hopper after the draft is discharged therefrom;

FIGURES 15, 16 and 17 diagrammatically illustrate the control and sequencing circuit shown in FIGURE 14 with FIGURES 16 and 17 being arranged beneath FIGURE 15 in the order named; and FIGURE 18 is a fragmentary perspective view illustrating the stepping switch mechanisms and the cam actuated contacts shown in FIGURES 15–17.

Referring now to the drawings and more particularly to FIGURE 1, the reference numeral 10 generally designates a storage bin having a bottom discharge opening 12 disposed vertically above a weigh hopper 14. Weigh hopper 14 has an open top 16 registering with opening 12 and a bottom discharge opening 18. A slidably mounted feed gate 19 is arranged to control flow of material through the storage bin discharge opening 12 and a slidably mounted discharge gate 20 is arranged to control flow of material through the weigh hopper discharge opening 18.

Feed gate 19 is actuated by a power piston 21 slidably disposed in a cylinder 22 to which pressurized air is supplied through a pipeline 23. Similarly, discharge gate 20 is actuated by a power piston 24 slidably mounted in a cylinder 25 to which pressurized air is supplied through a pipe line 26. Both of the power piston operators for feed gate 19 and discharge gate 20 are of standard form and consequently will not be described further.

With continued reference to FIGURE 1, weigh hopper 14 is suspended from a compound weighbeam assembly 27 which comprises an upper weighbeam 28 and a lower weighbeam 29. Weighbeam 28 is supported from a fixedly secured hanger 30 engaging a beam knife-edge 31 midway between the ends of the beam and providing a fulcrum for the beam.

Weighbeam 29 is supported from a fixedly secured hanger 32 engaging a knife edge 33 carried by the beam near the right-hand end thereof as viewed from FIGURE 1. Weighbeams 28 and 29 are pivotally inter-connected by a hanger member 34 engaging a knife edge 35 at the right-hand end of weighbeam 28 and a knife edge 36 mounted on weighbeam 29 between knife edge 33 and the left-hand end of the beam.

Weigh hopper 14 is suspended from assembly 27 by a pair of hangers 38 and 40. Hanger 38 engages a knife edge 42 mounted on weighbeam 29 adjacent the right-hand end thereof and hanger 40 engages a knife edge 44 on the left-hand end of weighbeam 28. The reaction of the weight of hopper 14 and the load in the hopper is balanced by the pull on hangers 38 and 40 which is divided between beams 28 and 29. The load transmitted to beam 28 is transmitted in turn, to beam 29 through member 34.

The load transmitted to beam 29 is counterbalanced by a tare weight 50 and a counterweight 52 which respectively balance the weight of hopper 14 when empty and a predetermined weight of material introduced into the hopper. Tare weight 50 and counterweight 52 are suspended from the floating end of weighbeam 29 by means of a hanger 54 which is pivoted on a knife edge 56 fixed to weighbeam 29.

Between knife edge 56 and knife edge 36, beam 29 is connected to a dash pot 60 of conventional construction to dampen the movement of beam 29, thus retarding displacement of the weighbeam past its balancing position. Adjacent to the left-hand end of weighbeam 29, a fixed stop abutment 62 is provided for preventing counter-clockwise pivotal movement of weighbeam 29 when the counterbalancing force exerted by counterweight 52 and tare weight 50 exceeds the weight of weigh hopper 14 and the weight of the load in the hopper.

When weigh hopper 14 is empty with counterweight 52 removed, weighbeam 29 assumes a generally horizontal position indicating the empty or zero balance condition of the scale system.

In accordance with the present invention weighbeam 29 governs the feeding of material to and discharge of material from weigh hopper 14. This is accomplished by means of a control and sequencing circuit 64 (FIGURE 2 and 3) which is shown in standby de-energized condition and which produces electrical impulses for actuating a plural order counter 65 (FIGURE 1) to register the weight value of the material in hopper 14. Operating power for circuit 64 is supplied between lines 66 and 68 on opposite sides of the circuit diagram illustrated in FIGURES 2 and 3 with current passing through a power switch 70 and a fuse 72 disposed in series in line 66.

Arranged in series circuit relationship across lines 66 and 68 is a discharge gate limit switch DG-LS1, a hold-run switch HR-S and a feed gate air valve solenoid FG-SD. Solenoid FG-SD actuates a valve 78 controlling passage of pressurized air through air supply conduit 23 to cylinder 22. Valve 78 may be of the conventional "four-way" type such as that shown in United States Letters Patent No. 1,263,778 issued April 23, 1918, to C. W. Larner and having two distinct actuating ports connected to cylinder 22 at opposite sides of piston 21, an inlet port connected to conduit 23 and an exhaust port (not shown) permitting the removal of air from either side of piston 21. When valve 78 is turned to supply pressurized air to one side of piston 21, the air in cylinder 22 at the opposite side of piston 21 is discharged through the exhaust port (not shown) of valve 78, thus causing displacement of piston 21 and consequently feed gate 19. Energization of solenoid FG-SD actuates valve 78 to admit pressurized air to cylinder 22 for axially shifting piston 21 from the position shown in FIGURE 1 to open feed gate 19 thereby permitting material to flow downwardly from bin 10 into weigh hopper 14. When solenoid FG-SD is de-energized, valve 78 is actuated to shift piston 21 to the position shown in FIGURE 1, thereby closing feed gate 19 and cutting off the feed to hopper 14.

Hold-run switch HR-S may be of any conventional type having a "hold" position and a "run" position. In "run" position the system will continuously and automatically repeat the weighing cycles involving the steps of feeding a draft of material into hopper 14, cutting off the feed, counting the weight of the draft and discharging the draft as will be presently described in detail. In "hold" position, switch HR-S opens upon the completion of one weighing cycle to de-energize solenoid FG-SD thus closing feed gate 19 to prevent further removal of material from bin 10.

Discharge limit switch DG-LS1 is actuated by an arm 80 abuttingly engageable with a member 82 mounted rigid with discharge gate 20. Switch DG-LS1 is arranged to close by closing discharge gate 20 and to open by opening gate 20. In this manner, switch DG-LS1 provides an interlock to prevent feed gate 19 from being opened whenever discharge gate 20 is open. When discharge gate 20 is closed, a circuit from energizing solenoid FG-SD may be completed providing certain other conditions prevail as will be presently described.

Also arranged in circuit 64 is a digitizer unit 84 which directly digitizes the overbalancing movement of weighbeam 29 to provide for a measurement of the load in excess of the weight value of material which balances counterweight 52.

As best shown in FIGURES 4-7 digitizer 84 comprises a rigid frame assembly 86 to which a rigid insulation pad 88 (FIGURE 6) is fixedly secured. Mounted on insulation pad 88 is a common strip terminal 90 having a row of twenty parallel spaced apart rigid contact fingers 92 (FIGURES 6 and 7) protruding from terminal 90.

Arranged to individually engage contact fingers 92 is a row of twenty flexible contact arms generally indicated at 98 and cooperating with fingers 92 to provide a bank of contacts D1 to D20 inclusive as shown in FIGURE 2. Flexible arms 98 are mounted vertically above contacts 92 and are made of any suitable electrically conductive leaf spring material. Contact arms 98 are individually cantilever mounted on insulation pad 88 and are normally biased individually into engagement with rigid contact fingers 92. In their normal contact engaging positions, contact arms 98 are contained in a common plane extending parallel to a plane containing rigid contact fingers 92 and project beyond contact fingers 92 by equal lengths as best seen from FIGURE 6.

As best shown in FIGURES 5 and 6, a contact actuator bar 100 is mounted on frame 86 by means of a flexible spring leaf member 102 and a rigid flat sided metallic armature 104. Spring leaf member 102 is secured to a plate section 106 of frame 86 and extends beyond plate section 106 abuttingly along the bottom face of armature 104. The outer end of member 102 extending beyond plate section 106 is suitably fixed to armature 104 which extends rearwardly between plate section 106 and insulating pad 88. Armature 104 is normally biased by spring leaf member 102 to a generally horizontal position and into abutment with plate section 106.

Actuator bar 100 is fixedly secured to the outer end of member 102 which extends beyond armature 104 and through a slot 108 in bar 100. Actuator bar 100 is made from suitable rigid flat sided electrical insulating material.

As best shown in FIGURE 6, actuator bar 100 is disposed in a generally upright position transversely of armature 104 and is biased upwardly by spring leaf member 102. Biasing actuator bar 100 downwardly against the force exerted by spring leaf member 102 are a pair of vertically disposed coil springs 118 and 120 having their upper ends secured to bar 100 and their lower ends secured to frame assembly 86.

With continued reference to FIGURES 5 and 6, actuator bar 100 is positioned vertically below contact arms 98 and extends transversely with respect to contact arms 98 in generally perpendicular relationship to the plane containing arms 98. As shown, actuator bar 100 is disposed forwardly of rigid contact fingers 92 and has a smooth straight top edge 122 which is inclined at a slight predetermined acute angle with the plane containing contact arms 98. Edge 122 is engageable with the portions of contact arms 98 extending beyond contact fingers 92 for flexing arms 98 to progressively actuate contacts D1 to D20 inclusive.

The combined biasing force of springs 118 and 120 is sufficiently greater than the biasing force exerted by spring leaf member 102 to pull actuator bar 100 downwardly and out of engagement with contact arms 98. As actuator bar 100 is downwardly displaced, as viewed from the drawings, spring leaf member 102 is flexed and armature 104 is tipped to raise its rearward end.

By the foregoing actuator bar construction, it is clear that movement of armature 104 toward a horizontal position, vertical displaces actuator bar 100 upwardly. Since top edge 122 is inclined, the left-most contact arm 98, as viewed from FIGURES 5 and 7, is abuttingly engaged first to open contacts D20. With further upward displacement of actuator bar 100, the remaining contact arms are successively engaged to successively open contacts D19, D18, D17, D16, D15, D14, D13, D12, D11, D10, D9, D8, D7, D6, D5, D4, D3, D2 and D1. Downward displacement of actuator bar 100 causes contacts D1, D2, D3, D4, D5, D6, D7, D8, D9, D10, D11, D12, D13, D14, D15, D16, D17, D18, D19 and D20 to successively close and remain closed until actuator bar 100 is raised.

As shown in FIGURES 1 and 6, armature 104 is connected to the weighbeam 29 by a suitable motion transmitting linkage indicated at 128 for directly transmitting movement of weighbeam 29 to armature 104. With this structure, clockwise movement of weighbeam 29, as viewed from FIGURES 1 and 6, tilts armature 104 to lower actuator bar 100, allowing the contacts in bank D1–D20 to progressively close depending on the magnitude of movement of beam 29. Similarly, counter-clockwise movement of beam 29 toward its rest position on stop 62 raises actuator bar 100 to progressively open the contacts in bank D1–D20 as previously described.

Connected to linkage 128 are a pair of temperature force sensing coil springs 130 and 132 which provide the weighing system with temperature stability. Spring 130 has its upper end fixedly retained and its lower end secured to linkage 128 so that it tends to swing beam 29 in a clockwise direction, as viewed from FIGURE 1. Spring 132 has its lower end fixedly retained and its upper end secured to linkage 128, thus tending to swing beam 29 in a counterclockwise direction against the bias of spring 130. Spring 132 is coiled oppositely from spring 130 but, otherwise, is identical in construction with the same deflection characteristics as compared to spring 130.

When weighbeam 29 is in its horizontal balanced position or at rest on stop 62, actuator bar 100 is held by armature 104 in its upper displaced position to maintain contacts D1–D20 open. Movement of beam 29 from its horizontal balanced position in an overbalancing clockwise direction tips armature 104 to displace actuator bar 100 downwardly by a magnitude proportional to the angular displacement of beam 29. As a result, the contacts in bank D1–D20 progressively close beginning with contacts D1. The number of contacts progressively closed by downward displacement of actuator bar 100 will consequently depend upon the magnitude of deflection of weighbeam 29 in an overbalancing direction. The total spring rate of all the springs in the system, including springs 102, 118, 120, 130 and 132 is preferably calculated to provide for a movement of actuator bar 100 that allows for one contact in bank D1–D20 to close for each pound of material received in hopper 14 in excess of the load required to balance the weight value of counterweight 52 on beam 29. Consequently, if the weight value of counterweight 52 is 1000 pounds and 1008 pounds are introduced into hopper 14, contacts D1, D2, D3, D4, D5, D6, D7 and D8 will successively close while contacts D9, D10, D11, D12, D13, D14, D15, D16, D17, D18, D19 and D20 will remain open.

As best shown in FIGURE 5, a dither coil 134 mounted on frame 86 vertically below plate section 106 has a core 135 projecting upwardly through an opening in plate section 106. Coil 134 is energized from a suitable alternating current source to dither armature 104 for overcoming friction in the system, thus assuring a correct setting of the contacts in bank D1–D20 in correspondence with the load in hopper 14.

With continued reference to FIGURES 4–7, the flexible contact arms 98 of contacts D1, D2, D3, D4, D5, D6, D7, D8, D9, D10, D11, D12, D13, D14, D15, D16, D17, D18, D19 and D20 are respectively separately connected to contact pins D1', D2', D3', D4', D5', D6', D7', D8', D9', D10', D11', D12', D13', D14', D15', D16', D17', D18', D19' and D20' by means of suitable electrical conductor leads indicated at 140. Terminal strip 90 is connected through a contact pin 144 (FIGURE 4) to line 66 by a conductor 145 (FIGURE 2). Contact pins D1'–D20' together with pin 144 are conveniently arranged in aligned rows and are electrically insulated from each other by an insulating pad 150 (FIGURE 4) in which they are mounted. Pad 150 is suitably fixed to frame 86.

With continued reference to FIGURE 2, a circuit is completed for energizing a feed stop relay F-C by closing contacts D1 in bank D1–D20. Relay F-C has two sets of contacts F-C1 and F-C2 which respectively are normally closed and normally open when no current is passing through the operating coil of relay F-C. Contacts F-C1 are in series with feed gate solenoid FG-SD and contacts F-C2 are in series with a stabilized timer relay S-T arranged across lines 66 and 68 in parallel with feed gate solenoid FG-SD and in series with switches DG-LS1 and HR-S. Consequently, energization of relay F-C opens contacts F-C1 to de-energize feed gate solenoid FG-SD for closing feed gate 19.

The closing of contacts F-C2 by energization of relay F-C completes a circuit to energize stabilizing timer relay S-T provided discharge gate limit switch DG-LS1 and hold-run switch HR-S are closed, and provided discharge gate 20 is electrically latched in closed position in a manner as will presently be described. Relay S-T is an adjustable delay timer to provide a sufficient time delay for the system to stabilize and for weighbeam 29 to come to rest before counter mechanism 65 is actuated to register the weight value of the draft introduced into hopper 14 as will be presently explained in detail.

When sufficient material has been introduced into weigh hopper 14 to balance the counterweight 52, weighbeam 29 will begin to move off its stop 62 to indicate a balanced scale condition. As a further increment of material is introduced into hopper 14 in excess of the balanced load, weighbeam 29 is deflected in an overbalancing direction and the first pound of overbalance deflects beam 29 sufficiently to close contacts D1 in the digitizer bank D1–D20. Closure of contacts D1 energizes relay F-C thus opening contacts F-C1 to de-energize feed gate solenoid FG-SD and enable feed gate 19 to start to close for concluding the feeding cycle. As feed gate 19 is closing, additional material descends into hopper 14 and this overbalance causes deflection of beam 29 to progressively close a corresponding number of contacts in bank D1–D20 in the manner previously described.

With reference to FIGURES 2, 3 and 8, a pulse controlled stepping switch mechanism 152 of generally conventional form is arranged in circuit 64 to automatically transfer to counter mechanism 65 the overbalance detected and digitized by digitizer 84 and to initiate the discharge cycle. As will presently become apparent, switch mechanism 152 further functions as a memory or storage medium to hold the digital information indicated by digitizer 84 for later reuse in adding the weight value of the overbalance to the weight record registered on counter mechanism 65. Once the digitized overbalance is stored by switch mechanism 152, the digital information indicated by digitizer 84 may be erased. Consequently, beam 29 may be moved prior to the count in of the overbalance without causing the loss of this weight information. This feature, as will be presently explained in detail, enables the count-in of the overbalance to be made while the draft is being discharged.

Switch mechanism 152 comprises the usual stepper coil S-C which attracts an armature 154 when energized. A pawl 156 of conventional form is mounted on armature 154 and engages a ratchet wheel 158 fixedly mounted on a rotatable shaft 160 which carries a wiper 162. Wiper 162 is arranged to successively engage a bank of twenty-one stationary contacts or terminals S1–S21 inclusive beginning with contact S1 and progressing to contact S21.

Thus it is clear that as stepper coil S-C is intermittently impulsed by means to be presently described, armature 154 is attracted each time stepper coil S-C is energized to advance ratchet wheel 158 through the engagement of pawl 156. With each impulse of stepper coil S-C, wiper 162 advances one contact in the bank S1–S21. When wiper 162 is in engagement with contact S21, a further impulse of stepper coil S-C will advance wiper 162 to contact S1, and on the next impulse of stepper coil S-C, wiper 162 will advance from contact S1 to contact S2 and so on.

With continuing reference to FIGURE 2, contacts S1, S2, S3, S4, S5, S6, S7, S8, S9, S10, S11, S12, S13, S14, S15, S16, S17, S18, S19 and S20 are respectively electrically connected to contacts D20, D19, D18, D17, D16, D15, D14, D13, D12, D11, D10, D9, D8, D7, D6, D5, D4, D3, D2 and D1 of digitizer 84 through the corresponding contact pins D20', D19', D18', D17' D16', D15', D14', D13', D12', D11', D10', D9', D8', D7', D6', D5', D4', D3', D2' and D1'. Contact S21 represents a "home" position for wiper 162 and is electrically isolated from the contact bank D1–D20 of digitizer 84.

Wiper 162 is electrically connected to conductor 68 in series with a relay R-C and a normally open set of contacts S-T1 of timer relay S-T as shown in FIGURE 2. Thus when any number of the digitizer contacts in bank D1–D20 are accumulatively closed and wiper 162 is advanced by impulsing coil S-C to the stepper contact in bank S1–S20 which is electrically connected to the last digitizer contact in bank D1–D20 to be cloesd, a circuit is completed to energize relay R-C provided contacts S-T1 are closed. If contacts D1 through D8 are closed, for example, and wiper 162 is stepped from contact S21 by impulsing stepper coil S-C, relay R-C will be energized when wiper 162 reaches contact S13 providing that contacts S-T1 are closed.

With continued reference to FIGURES 2 and 3, relay R-C has two sets of contacts R-C1 and R-C2 (FIGURE 3) which are respectively normally open and normally closed when no current is passing through the operating coil of relay R-C. When relay R-C is energized, contacts R-C1 close to energize a buffer count setup timer relay R-T which is in series with contacts R-C1 and which has a set of normally open contacts R-T1 (FIGURE 3). Following energization of relay R-T, contacts R-T1 will close after a short predetermined time delay to energize a discharge latch relay D-L (FIGURE 3) which is in series with contacts R-T1.

Energization of relay D-L opens contacts D-L1 (FIGURE 2) and D-L2 (FIGURE 3) and closes contacts D-L3 and D-L4 (FIGURE 3) thus transferring contacts D-L1, D-L2, D-L3 and D-L4 to opposite positions from that shown in FIGURES 2 and 3 where they are latched in place until a discharge latch release coil D-U is energized as will be presently explained in detail.

Contacts D-L3 of latch relay D-L are in series with a feed gate limit switch FG-LS and discharge air valve solenoid D-SD connected across lines 66 and 68. Solenoid D-SD actuates a valve 166 (FIGURE 1) controlling passage of pressurized air through air supply conduit 26 to cylinder 25. Valve 166 is of the same construction as valve 78 and has two distinct actuating ports connected to cylinder 22 at opposite sides of piston 24, an inlet port connected to air supply conduit 26 and an exhaust port (not shown) permitting discharge of air from either side of piston 24. When valve 166 is turned to supply pressurized air to one side of piston 24, the air in cylinder 25 at the opposite side of piston 24 is discharged through the exhaust port (not shown) of valve 166, thus causing displacement of piston 24 which moves discharge gate 20. Energization of solenoid D-SD actuates valve 166 to admit pressurized air to cylinder 25 for axially shifting piston 24 from the position shown in FIGURE 1 to open discharge gate 20 thereby permitting material in hopper 14 to discharge through outlet 18. When solenoid D-SD is de-energized, valve 166 is actuated to shift piston 24 to the position shown in FIGURE 1, thereby closing discharge gate 20.

Feed gate limit switch FG-LS is actuated by an arm 168 abuttingly engageable with a member 170 mounted rigid with feed gate 19. Switch FG-LS is arranged to close by closing feed gate 19 and to open by opening feed gate 19. Thus switch FG-LS provides an interlock to prevent discharge gate 20 from being opened whenever feed gate 19 is open. When feed gate 19 is closed and discharge latch relay D-L has been energized to close contacts D-L3, a circuit for energizing discharge gate solenoid D-SD is completed, thus opening discharge gate 20 to facilitate removal of material in hopper 14.

Contacts D-L1 of latch relay D-L are in series with feed gate solenoid FG-SD and with stabilizing timer relay S-T. When latch relay D-L is energized to cause energization of discharge air solenoid D-SD through contacts D-L3, contacts D-L1 are opened to prevent energization of feed gate solenoid FG-SD or timer relay S-T.

With continuing reference to FIGURES 2 and 3, contacts D-L4 are closed by energization of latch relay D-L to energize a thousands digit impulse relay T-T (FIGURE 3) connected across lines 66 and 68 in series with contacts D-L4. Contacts D-L4 are also connected in series with a thousands digit counter solenoid T-SD (FIGURE 3) through a set of normally closed time delay contacts T-T1 which are actuated by relay T-T. As shown, counter solenoid T-SD is in parallel with impulse relay T-T and in series with contacts T-T1. When contacts D-L4 are closed with the foregoing circuitry, both the counter solenoid T-SD and the impulse relay T-T are simultaneously energized with counter solenoid T-SD being energized through the normally closed contacts T-T1. By energizing impulse relay T-T, contacts T-T1 will open after a short preselected time delay of about 2–3 seconds thus causing counter solenoid T-SD to be de-energized. As a result, counter solenoid T-SD is only impulsed in response to the energization of latch relay D-L and the timer relay T-T.

Counter solenoid T-SD has an armature 171 (FIGURES 1 and 3) operably connected to counter 65 in a manner as will presently be described.

Counter 65 is preferably of the accumulative set-back decimal type and has a revolvable thousands order counter wheel 172, a revolvable hundreds order counter wheel 174, a revolvable tens order counter wheel 176 and a units order counter wheel 178. Additional counter wheels 180 of progressively higher orders than counter wheel 172 may be provided to enable the registration of a plural digit number corresponding to the needs of the system. Counter wheels 174 and 176 are arranged to be respectively advanced by counter wheels 176 and 178 in the conventional manner and consequently this structure need not be further described.

With the present invention the counter wheel having an order corresponding to the weight value of counterweight 52 is arranged to be advanced independently of any of the lower order counter wheels. In this embodiment the weight value of counterweight 52 is illustratively selected to be 1000 pounds. Consequently, the thousands order counter wheel 172 is arranged to be driven independently of counter wheels 174, 176 and 178.

Independent advancement of counter wheel 172 may be accomplished in any suitable manner. For instance, a gear 182, as shown in FIGURE 3 may be mounted rigid with counter wheel 172. A pawl 184 actuated by armature 171 is engageable with gear 182 for advancing counter wheel 172. Thus when counter solenoid T-SD is impulsed, as previously described, pawl 184 arranged to be actuated by the movement of armature 171, advances counter wheel 172 1/10 of a revolution or one digit.

In addition to this independent advancement of the counter wheel 172, wheel 172 is conventionally advanced from the counter wheel 174 by suitable means such as a pin 186 fixed rigid with counter wheel 174 and a shaft mounted pinion 188 in continuous engagement with gear 182 and disposed in the circular path of pin 186. As pin 186 is rotated with counter wheel 174, pin 186 will engage pinion 188 once with each revolution of wheel 174 and in passing pinion 188, the pin 186 will move pinion 188 forward by one tooth. This advancement of pinion 188 causes a corresponding advancement of gear 182 to advance the counter wheel 172 1/10 of a revolution with each revolution of counter wheel 174.

Consequently, it is clear that the thousands order counter wheel 172 is advanced 1/10 of a revolution or one digit by impulsing counter solenoid T-SD once to register the weight value of the load in hopper 14 which secures a balanced condition with counterweight 52 and which in the present embodiment is 1000 pounds. If counterweight 52 is replaced with a weight having a value of 100 pounds so that a balance scale condition is secured at 100 pounds, then the hundred order counter wheel 174 is connected to be advanced independently by impulsing solenoid T-SD instead of independently advancing the thousands order counter wheel 172.

With continued reference to FIGURE 3, counter wheel 178 is advanced by impulsing a units counter solenoid U-SD which has an armature 190 operably connected to a pawl 192. Pawl 192 engages a gear 194 fixed rigid with counter wheel 178. Impulsing of solenoid U-SD moves armature 190 to actuate pawl 192 and with each impulse of solenoid U-SD, counter wheel 178 is thereby advanced one digit or 1/10 of a revolution.

As shown in FIGURE 3, counter solenoid U-SD is arranged across lines 66 and 68 in parallel with solenoid T-SD but in series with contacts D-L4 and a set of contacts S-C1 which are actuated by stepper coils S-C and which are normally open when no current is passing through stepper coil S-C. Consequently, counter solenoid U-SD will be energized when both sets of contacts D-L4 and S-C1 are closed. In order to energize stepper coil S-C and thereby cause wiper 162 to be stepped in the manner as previously described, power is applied through lines 66 and 68 across opposite sides of a rectifier bridge 196 at terminals 198 and 200. A stepper network 202 for advancing wiper 162 is arranged across terminals 204 and 206 of bridge 196 and contains stepper coil S-C. Stepper network 202 comprises a stepper impulse timer relay C-T which is arranged across terminals 204 and 206 in parallel with stepper coil S-C and which has a set of normally open time delay contacts C-T1 in series with stepper coil S-C. Contacts C-T1 are closed by energizing coil C-T following a short time delay of two to three seconds after the energization of coil C-T.

Contacts R-C2 and D-L2 together with a set of normally open time delay contacts S-T2 of stabilizing timer relay S-T are arranged across terminals 204 and 206 in series with relay C-T and coil S-C in the manner shown. Stepper coil S-C has a set of normally closed contacts S-C2 arranged in series with impulse timer relay C-T so that energization of stepper coil S-C will open contacts S-C2 to cause timer relay C-T to de-energize.

Assuming contacts S-T2, R-C2 and D-L2 to be closed, impulse timer relay C-T will be energized through the normally closed contacts S-C2. As a result, contacts C-T1 close to energize stepper coil S-C through contacts S-T2, R-C2 and D-L2. As soon as stepper coil S-C is energized, contacts S-C2 open to de-energize the impulse timer relay C-T and thus cause contacts C-T1 to open for de-energizing coil S-C. As a result, stepper coil S-C is impulsed.

With each pulse of stepper coil S-C, pawl 156 engages ratchet wheel 158, advancing wiper 162 one step forward along the contacts in bank S1–S21.

With the foregoing stepper network, it is clear that energization of feed stop relay F-C by introducing an overbalance of at least one pound into hopper 14, causes stabilizing timer relay S-T to be energized which, after a short time delay, will close contacts S-T2. With wiper 162 at its home position on contact S21, relays R-C and D-L will be de-energized and, consequently contacts R-C2 and D-L2 will be closed. As a result of adding at least one pound of material in excess of a balanced load, therefore, stepper mechanism 152 is actuated to advance wiper 162 of contact S21 in the manner previously described.

By advancing wiper 162 in this manner to the contact in bank S1–S21 which is connected to the last contact in digitizer bank D1–D20 closed by the overbalance in hopper 14, relays R-C and D-L are energized, as previously described, to open contacts R-C2 and D-L2. As a result, advancement of wiper 162 is temporarily interrupted with wiper 162 being positioned on the contact in bank S1–S21 which is connected to the last contact to be closed in bank D1–D20.

When any or all of contacts S-T2, R-C2 or D-L2 are open, impulse timer relay C-T may be energized through contacts T-T2 and W1 which are arranged across terminals 204 and 206 in series with timer relay C-T and coil S-C and in parallel with contacts S-T2, R-C2 and D-L2. Contacts T-T2 are normally open when no current is passing through impulse relay T-T and close after a short time delay following energization of relay T-T.

Contacts W1 are actuated by means of a cam 210 (FIGURE 9) mounted on shaft 160 and having a single rise 211 which reciprocates a follower 212. By lifting follower 212, contacts W1 are opened. Cam rise 211 is arranged to lift follower 212 when wiper 162 is stepped to its "home" position on contact S21. As a result, contacts W1 are opened only when wiper 162 is at its "home" position on contact S21 and are closed when wiper 162 is stepped off contact S21 to any of the other contacts in bank S1–S21.

Thus, by energizing relay D-L, as previously described, contacts D-L4 close to energize impulse relay T-T which remains energized until contacts D-L4 are unlatched by the release relay D-U as will be presently explained. Energization of relay T-T closes contacts T-T2 and provided that wiper 162 is off its "home" position, contacts W1 will be closed to energize timer relay C-T for impulsing stepper coil S-C in the manner previously described. As a result, wiper 162 will be stepped toward its "home" position at contact S21 and upon reaching its "home" position, contacts W1 will open to interrupt the energizing circuit to timer relay C-T and stepper coil S-C thus preventing further advancement of wiper 162.

With contacts D-L4 latched in closed position, each impulse of stepper coil S-C causing wiper 162 to advance toward its "home" position will close contacts S-C1 to impulse counter solenoid U-SD. Thus it is clear that solenoid U-SD will be impulsed with each step made by wiper 162 toward its "home" position at contact S21.

With continued reference to FIGURES 3 and 9, a second set of contacts W2 actuated by cam 210 is arranged in series with discharge latch release relay D-U across lines 66 and 68. Contacts W2 are closed by cam 210 simultaneously with the opening of contacts W1 when wiper 162 is advanced to its "home" position at contact S21. Also arranged across lines 66 and 68 in parallel with latch release relay D-U is a discharge timer relay D-T having a set of normally open timer delay contacts D-T1 in series with contacts W2 and relay D-U. Relay D-T is energized by closing of a discharge gate limit switch DG-LS2. Switch DG-LS2 is normally open when discharge gate 20 is open and is closed by arm 80 when gate 20 is shifted to its closed position.

Thus with closing of discharge gate 20, switch DG-LS2 is closed to cause relay D-T to be energized. After a short time delay following energization of relay D-T, contacts D-T1 close. When wiper 162 has returned to its home position on contact S21, contacts W2 will close thus completing a circuit for energizing latch release relay D-U. Energization of latch release relay D-U will release contacts D-L1, D-L2, D-L3 and D-L4 to the position illustrated in the drawings.

For the purpose of describing the operation of the system illustrated in FIGURES 1–9, the nominal capacity of weight hopper 14 is selected to be 1000 pounds and the weight value of counterweight 52 is also selected to be 1000 pounds to balance the nominal load or draft introduced into weigh hopper 14. With hopper 14 empty and gates 19 and 20 closed, counterweight 52 when placed on hanger 54 unbalances weighbeam 29 to swing beam 29 down into engagement with stop 62. In this unbalanced position of weighbeam 29, as previously explained, actuator bar 100 of digitizer 84 is raised to open all the contacts in bank D1–D20.

Thus, prior to setting the system in operation, hopper 14 is assumed to be empty with gates 19 and 20 closed and wiper 162 at its home position on contact S21. To start the operation of the automatic weighing system, switches 70 and HR-S are closed. If contacts F-C1 and D-L1 are closed and switch DG-LS1 is closed, feed gate solenoid FG-SD will be energized to open feed gate 19 and thereby admit material from bin 10 into weigh hopper 14. Contacts F-C1 will be closed providing that actuator bar 100 has been raised by beam 29 to maintain contacts D1 open, thus preventing relay F-C from being energized. As a result, normally closed contacts F-C1 assure that actuator bar 100 has been lifted sufficiently to open all of the contacts in bank D1–D20 including contacts D1 which will be the last to be opened by upward displacement of actuator bar 100.

Contacts D-L1 will be closed providing that discharge latch relay D-L is de-energized which indicates that the precedent discharge cycle is completed and that counter solenoids U-SD and T-SD have been impulsed to count the weight of the precedent draft of material as will be presently explained in detail. Discharge gate limit switch DG-LS1 will be closed if discharge gate is closed, thus preventing the possibility of feeding material from bin 10 with discharge gate 20 open.

When solenoid FG-SD is energized to open feed gate 19, material begins to feed into weigh hopper 14 from bin 10. While material is being fed into hopper 14 up to amounts less than 1000 pounds, weighbeam 29 remains at rest in its unbalanced position on stop 62. Consequently there is no movement of beam 29 or of actuator bar 100 until the load in hopper 14 balances weight 52. Contacts D1–D20, therefore, will remain open until after a balancing load of 1000 pounds has been introduced into hopper 14 to move beam 29 off its stop 62.

As soon as 1000 pounds of material have been fed into hopper 14, counterweight 52 is balanced to initiate movement of beam 29 in a clockwise direction (as viewed from FIGURE 1) to a balanced position.

Concomitantly with the movement of beam 29, actuator bar 100 will begin to lower. As the first pound in excess of the 1000 pound balancing load enters hopper 14, contacts D1 will close before any of the remaining contacts in bank D1–D20 are allowed to sequentially close. Closing of contacts D1 energizes relay F-C to open contacts F-C1 and to close contacts F-C2 to respectively de-energize feed gate solenoid FG-SD and to energize stabilizing timer relay S-T.

By de-energizing solenoid FG-SD, feed gate 19 will begin to close. Before gate 19 is fully closed, however, an additional amount of material will enter hopper 14 as previously mentioned. This additional amount of material will be in excess of the nominal draft of 1000 pounds which has already entered hopper 14 to secure a balanced scale condition and consequently must be counted if the actual weight of the draft received by hopper 14 is to be accurately determined and registered. The range of digitizer 84, as determined by the number of contacts in bank D1–D20, is made sufficiently large to adequately handle all the expected amount of overbalance.

For the purpose of describing the operation of the weighing system according to the present invention, it will be assumed that the additional amount of material entering hopper 14 before gate 19 completely closes is 4 pounds. Thus, the weight value of the draft in hopper 14 will be 1004 pounds.

With 1004 pounds of material in hopper 14, weighbeam 29 is moved in an overbalancing direction by an angular distance corresponding to the additional 4 pounds to cause actuator bar 100 to be lowered a corresponding distance for allowing contacts D1, D2, D3 and D4 to sequentially close with contacts D5–D20 remaining open. Closing of contacts D1, as previously explained, results in the energization of stabilizing timer relay S-T through contacts F-C2 which were closed by energization of relay F-C. After a short time delay following energization of relay S-T, which is concomitant with the de-energization of feed gate solenoid FG-SD, contacts S-T1 and S-T2 are closed. This time delay is sufficiently long to allow beam 29 to come to a rest position after all the material has entered hopper 14 since it will be appreciated that beam 29 is still in motion when relay S-T is energized and solenoid FG-SD is de-energized.

After this stabilizing period permitting beam 29 to come to rest and for feed gate 19 to completely close, the stepper impulse timer relay C-T is energized through normally closed contacts R-C2, D-L2 and S-C2 and contacts S-T2 which close by energizing relay S-T to activate the stepper network 202. By energizing impulse timer relay C-T, contacts C-T1 close after a short delay to energize stepper coil S-C which is impulsed in the manner previously described to advance wiper 162 through a self-interrupting action with the rate of advancement being determined by timer relay C-T. Thus, with each discrete impulse of stepper coil S-C, wiper 162 will be advanced one step forward beginning from its home position at contact S21.

Where contacts D1–D4 are closed and contacts D5–D20 are open, wiper 162 will be automatically advanced from contact S21 and through contacts S1–S16. When wiper 162 is advanced the next step to contact S17, thus reaching coincidence with the first shorted digitizer position represented by contacts D4, a circuit is completed for energizing relay R-C through closed contacts D4, wiper 162 and contacts S-T1 which were closed by energization of stabilizing timer relay S-T.

By energizing relay R-C, the stepper network 202 is immediately de-activated by the opening of contacts R-C2 to interrupt the circuit to timer relay C-T and to stepper coil S-C. As a result, the advancement of wiper 162 is stopped with wiper 162 remaining on contact S17. Thus wiper 162 assumes a position coincident with the digitizer position prior to the discharge of material from hopper 14. Wiper 162, as will presently become apparent, remains at its coincidence position on contact S17 until called on to relay the stored information to counter 65.

Energization of relay R-C also closes contacts R-C1 to energize relay R-T. After a short delay following energization of relay R-T, contacts R-T1 will close causing the discharge latch relay D-L to be energized to transfer contacts D-L1, D-L2, D-L3 and D-L4 to opposite positions from that shown in the drawings for checking the circuit before discharge gate 20 is opened. Opening of contacts D-L1 locks out feed gate solenoid FG-SD to assure that solenoid FG-SD will not be accidentally energized to open feed gate 19 when discharge gate 20 is open. Opening of contacts D-L2 locks out the stepper advance network 202 to assure that timer relay C-T and stepper coil S-C are not energized through the circuit containing contacts S-T2 to retain wiper 162 at its coincidence position on contact S17.

Closing of contacts D-L4 energizes relay T-T to impulse counter solenoid T-SD once thereby advancing the thousands order counter wheel 172 by a single count or digit as previously described to register the weight value of the nominal draft of 1000 pounds at which the balanced scale condition was secured. When relay T-T, times out to open contacts T-T1, the impulse is removed from solenoid T-SD. Thus the impulsing of the thousands order counter wheel 172 is accomplished before the count in of the units order counter wheel 178. This prevents any difficulty should the units count-in cause a transfer from the hundreds order to the thousands order on counter 65.

Closing of contacts D-L4 also conditions the count-in of the 4 pound overbalance on counter wheel 178, since with contacts D-L4 closed, further impulsing of stepper coil S-C will complete a circuit for impulsing counter solenoid U-SD by closing contacts S-C1. To this end, it will be appreciated that when stepper coil S-C was initially impulsed to advance wiper 162 to contact S17, relay D-L was in a de-energized condition with contacts D-L4 open, thus preventing a circuit from being completed for impulsing counter solenoid U-SD.

Closing of contacts D-L3 energizes discharge solenoid D-SD to open discharge gate 20 and start the removal of the draft from hopper 14 provided that switch FG-LS is closed indicating that feed gate 19 is closed. Since the count-in of the 4 pound overbalance is accomplished by closing contacts T-T2 which occurs a short time delay after relay D-L and solenoid D-SD are energized, the discharge of material begins prior to the count in of the overbalance. Thus it will be appreciated that as the material in hopper 14 begins to discharge, weighbeam 29 will begin to return to its unbalanced rest position on stop 62 to displace actuator bar 100 upwardly for sequentially opening contacts D4, D3, D2 and D1. As a result, erasing of the digitized overbalance indicated by digitizer 84 is begun prior to the count-in of the information on counter 65. Wiper 162, however, is held through this phase of the operation in its position on contact S17 thus marking the digitized overbalance detected by digitizer 84.

While the material is being discharge, impulse relay T-T, which was energized concomitantly with relay D-L, times out to close contacts T-T2 thereby activating the stepper network 202 for starting the units count in on counter 65. By closing contacts T-T2, timer relay C-T will be energized since contacts W1 are closed as a result of advancing wiper 162 off contact S21.

Energization of timer relay through closed contacts T-T2 and W1 initiates the impulsing of stepper coil S-C again through the opening and closing of contacts C-T1 and S-C2 as previously described. By impulsing stepper coil S-C again, wiper 162 is advanced from contact S17 toward its "home" position at contact S21.

With wiper 162 on contact S17, four impulses of stepper coil S-C are required to advance to contact S21. Thus, as wiper 162 is stepped from contact S17 toward its home position at contact S21, counter solenoid U-SD will be impulsed once for each advancing step of the wiper through the repeated opening and closing of contacts S-C1. As a result, solenoid U-SD will be impulsed four times in correspondence with the four pound overbalance originally introduced into hopper 14. With each of the four impulses of solenoid U-SD, the units order counter wheel 178 of counter 65 is advanced one digit thus adding an addend of four to the augend of 1000 previously registered by the single impulse of solenoid T-SD to total 1004 which is the actual weight value of the draft introduced into hopper 14.

When wiper 162 reaches its home position at contact S21, contacts W1 are opened by cam 210 to de-energize timer relay C-T and stepper coil S-C, thereby de-activating the stepper network 202 to prevent further advancement of wiper 162 beyond contact S21.

Upon the removal of the first 4 pounds of material from hopper 14, contacts D1, D2, D3 and D4 will all open by the resulting movement of beam 29. With the opening of contacts D1 and D4, relays F-C, S-T, R-C, R-T and D-L become de-energized. Since contacts D-L1, D-L2, D-L3 and D-L4 are latched in the positions opposite to that shown in the drawings, contacts D-L1 and D-L2 remain open and contacts D-L3 and D-L4 remain closed even though relay D-L is de-energized. With contacts D-L1 still open, feed solenoid FG-SD cannot be energized thus maintaining feed gate 19 closed during the discharge cycle. With contacts D-L3 still closed and feed gate 19 closed, discharge solenoid D-SD remains energized to maintain discharge gate 20 open to continue the uninterrupted removal of material from hopper 14.

As a result of opening discharge gate 20, switch DG-LS2 is closed to energize the discharge timer relay D-T which is set to allow a sufficient time for completely discharging all the material in hopper 14 prior to the introduction of the next draft. Following this time delay in with the draft in hopper 14 is completely discharged, discharge timer relay D-T times out to close contacts D-T1. Providing that wiper 162 has been returned to its "home" position at contact S21 to close contacts W2, a circuit will be completed through contacts D-T1 for energizing the discharge latch release relay D-U.

Closing of contacts W2 assures that the units count in has been completed as reflected by the position of wiper 162. If the units have not been completed at the time which contacts D-T1 are closed and wiper 162 is still being stepped toward its home position, contacts W2 will be open, thus preventing premature energization of latch release relay D-U.

Thus, assuming that the units count-in has been completed and wiper 162 has been advanced to contact S21, latch release relay D-U will be energized to unlatch contacts D-L1, D-L2, D-L3 and D-L4 so that contacts D-L1, D-L2, D-L3 and D-L4 are transferred to the positions illustrated in FIGURES 2 and 3. By opening contacts D-L3, discharge gate solenoid D-SD is de-energized to cause discharge gate 20 to close. At the same time, contacts D-L1 are closed to again energize feed gate solenoid FG-SD for admitting the next draft of material to hopper 14. The entire weighing cycle, just described, is now automatically repeated as many times as is desired with the actual weight of each successive draft being determined and added to the augend on counter 65.

From the foregoing, it will be appreciated that counter solenoid U-SD is being impulsed while the draft in hopper 14 is being discharged, thus enabling the units count-in to be made as the material is being removed. As a result of utilizing the discharge time to count in the overbalance, it is not necessary to hold up the feeding of the next draft to hopper 14 to permit time for actuating the counter or other weight manifestation apparatus. Thus a considerable savings in time is realized in weighing successive drafts of material.

An additional savings in time in which to manifest the weight of each successive draft is realized by independently revolving the counter wheel having an order which corresponds numerically to the value of counterweight 52. In the present embodiment the selected order is 1000 although it may be any other order depending upon the selected weight value of counterweight 52 or the type of counting system utilized.

With the decimal counting system, as used in the present invention, it has been standard practice heretofore to fill a weigh hopper or other load receiving element with material and then to record the weight of the material by counting in each pound of material on the units order digit and making the customary transfers to the higher order digits as the lower order digits complete each revolution. With the usual simplified inexpensive type of electro-mechanical counting devices having, for example, solenoid actuated pawls engaging ratchet wheels, the pawl is activated each time to advance the units order digit by one number or 1/10 of a revolution. Thus, when registering a value of 1000, the pawl must be actuated and released 1000 times. This requires an appreciable amount of time and consequently would cause a correspondingly significant delay in completing each weighing cycle.

With the present invention, the necessity of actuating the counter pawl a number of times corresponding numerically to the value of the counterweight is eliminated due to the provision of an independent drive for the highest order having a non-zero digit corresponding to the weight value of the counterweight. Thus in the embodiment of FIGURES 1–9, it is only necessary to produce one impulse for actuating the mechanism in counter 65 to facilitate the manifestation of the numerical value corresponding to the weight value of the load in hopper 14 which secures a balanced condition with counterweight 52. As a result, a considerable savings in time is realized in manifesting the weights of the drafts, thus providing for a more rapid operation of repeated weighing cycles.

By directly connecting digitizer 84 of the present invention to weighbeam 29, it is apparent that the information manifested by digitizer 84 accurately represents the actual amount of overbalance resulting from the inavoidable delay in completley closing feed gate 19. Consequently, the necessity of estimating or compensating for the weight of deviation from a balanced scale condition together with the errors attributable to such compensation or estimation is entirely eliminated.

With the relationship of the various elements in the weighing system described in the embodiment of FIGURES 1–9, the sensitivity of the digitizer 84 may always be made appreciably coarser than that of counter 65. As a result, the need for a more complicated analog-to-digital converter unit having a sensitivity corresponding to the counter or other manifestation apparatus is eliminated without affecting the accuracy of the counter in any way.

Due to the novel arrangement of components in the weighing system of the present invention, control and sequencing circuit 64 is extremely simplified and incorporates uncomplicated highly reliable components without sacrifice of accuracy, cost and speed of operation. Also, as a result of the novel arrangement of elements in the circuit 64, digitizer 84 may be simple in construction in addition to being accurate and extremely reliable.

FIGURES 10–13 illustrate another embodiment of the present invention in which the weight of any residue remaining in hopper 14 after the draft is discharged through the hopper outlet 18 is accurately detected and accounted for to provide for a correct manifestation of the amount of material discharged from hopper 14. With the embodiment illustrated in FIGURES 1–9, post weighings are made only of a full hopper. Consequently, this system is satisfactory primarily for material which does not tend to adhere in relatively large amounts to the inner wall surfaces of hopper 14. With embodiment illustrated in FIGURES 10–13, however, post weighings are made of both an empty and a full hopper, in a manner as will presently become apparent to detect the weight value of any residue remaining in the hopper in addition to detecting the weight value of the overbalance.

In the second embodiment illustrated in FIGURES 10–13, parts corresponding to identical parts in the embodiment of FIGURES 1–9 are designated by the same reference characters.

With reference now to FIGURE 10, the scale beam structure supporting weigh hopper 14 is the same as that described in the embodiment of FIGURES 1–9 except that the counterweight 52 is removably mounted on hanger 54 by means of a power motor unit 220. Motor unit 220 comprises a fixed cylinder 222 and a power piston member 224 slidably mounted in cylinder 222. An actuator 226 rigidly joins member 224 to counterweight 52 which is slidably mounted on the shank portion of hanger 54 between a position where it is supported on tare weight 50 and a position where it is raised vertically above tare weight 50 and supported in raised position by piston member 224.

By supplying pressurized air to cylinder 222, piston member 224 is displaced vertically upwardly to lift counterweight 52 off tare weight 50 and to support counterweight 52 in this raised position, thus leaving only tare weight 50 to counterbalance the weight of hopper 14 and the weight of any material therein.

To accomplish post weighings of the hopper after each discharge, discharge latch relay D-L is provided with two additional sets of contacts D-L5 and D-L6 which are respectively normally open and normally closed when no current is passing through relay D-L. When relay D-L is energized, contacts D-L5 are closed completing a circuit to energize an empty latch relay E-L arranged across lines 66 and 68 in parallel with discharge latch relay D-L. Empty latch relay E-L has two sets of normally closed contacts E-L1 (FIGURE 11) and E-L4 (FIGURE 12) and two sets of normally open contacts E-L2 and E-L3 (FIGURE 13). Energization of empty latch relay E-L opens contacts E-L1 and E-L4 and closes contacts E-L2 and E-L3, thus transferring contacts E-L1, E-L2, E-L3 and E-L4 to opposite positions from that shown in the drawings where they are latched in place until an empty latch release relay E-U is enregized as will be presently explained in detail.

Contacts E-L1 replace contacts D-L1 in the circuit and are arranged across lines 66 and 68 in parallel with feed gate air valve solenoid FG-SD and stabilizing timer relay S-T to prevent solenoid FG-SD and timer relay S-T from being energized until empty latch release relay E-U is energized to release contacts E-L1 from an open latched position.

When switches DG-LS1 and HR-S are closed and contacts E-L1 are also closed, a circuit is completed for energizing a feed delay timer relay F-T (FIGURE 11) arranged in series with contacts E-L1 and in parallel with solenoid FG-SD, stabilizing timer relay S-T and contacts F-C1 and F-C2.

Timer relay F-T has a set of contacts F-T1 which close after a short preselected time delay following energization of relay F-T and which are in series with solenoid FG-SD and timer relay S-T. Thus, when discharge gate 20 is closed and contacts E-L1 are released to the closed position illustrated in the drawings, solenoid FG-SD is energized after a short time delay to allow the system to stabilize before starting another feeding cycle.

Contacts E-L2 are arranged in series with contacts D-L3 and with discharge air valve solenoid D-SD so that solenoid D-SD will be energized when contacts E-L2 and D-L3 and switch FG-LS are all closed.

Contacts E-L3 are arranged across lines 66 and 68 in series with contacts D-L6 and a counterweight removal solenoid WR-SD (FIGURES 10 and 12). Solenoid WR-SD actuates a valve 230 (FIGURE 10) controlling flow of pressurized air through an air supply conduit 232. Valve 230 is of the conventional "three-way" type having an inlet port connected to conduit 232, an outlet port connected to cylinder 222 by a conduit 233 and an exhaust port. In one position of valve 230, pressurized air from conduit 232 is admitted to cylinder 222 and the exhaust port of valve 230 is closed. In the other position of valve 230, cylinder 222 is connected to the exhaust port of valve 230 to release pressurized air in the cylinder.

By energizing latch relay E-L and by energizing discharge latch release relay D-U after the latching relay D-L is de-energized, contacts E-L3 and D-L6 are closed to energize solenoid WR-SD. Energization of solenoid WR-SD actuates valve 230 to permit pressurized air from conduit 232 to enter cylinder 222 and displace piston member 224 for lifting counterweight 52 from a position at rest on tare weight 50.

Simultaneously energized with solenoid WR-SD is an empty stabilizing timer relay Z-T which is arranged in parallel with solenoid WR-SD and in series with contacts E-L3 and D-L6. Timer relay Z-T has three sets of normally open contacts Z-T1 (FIGURE 11), Z-T2 (FIGURE 12) and Z-T3 which close following a short time delay after timer Z-T is energized to allow the weighing system to stabilize and for beam 29 to come to rest after the draft in weigh hopper 14 is discharged.

As shown in FIGURE 11, contacts Z-T1 are connected across lines 66 and 68 in series with a wiper 236 and a tare count relay X-C. Wiper 236 engages a series of stationary contacts TC1 to TC21 inclusive to set up a circuit for counting in residue left in hopper 14 after the draft has been discharged. Wiper 236 is advanced with a self-interrupting action by impulsing stepper coil S-C in the same manner as described with respect to wiper 162. With each impulse of stepper coil S-C, wiper 236 will be advanced one step forward into engagement with contacts TC1–TC21. With wiper 236 on contact TC21, one impulse of stepper coil S-C will advance wiper 236 to contact TC1 and on the next impulse of stepper coil S-C, wiper 236 will be advanced to contact TC2 and so on.

Contacts TC1, TC2, TC3, TC4, TC5, TC6, TC7, TC8, TC9, TC10, TC11, TC12, TC13, TC14, TC15, TC16, TC17, TC18, TC19 and TC20 are respectively connected to the flexible contact arms 98 of digitizer contacts D1, D2, D3, D4, D5, D6, D7, D8, D9, D10, D11, D12, D13, D14, D15, D16, D17, D18, D19 and D20 in parallel circuit relationship with stepper contacts S20, S19, S18, S17, S16, S15, S14, S13, S12, S11, S10, S9, S8, S7, S6, S5, S4, S3, S2 and S1. Contact TC21 is connected to line 66 to enable relay X-C to be energized when wiper 236 engages contact TC21 provided that contacts Z-T1 are closed. Wipers 162 and 236 are arranged to simultaneously engage their respective contacts S21 and TC21 for a purpose as will presently appear.

With the foregoing stepper bank construction, it is evident that bank S1–S21 provides a first level of contacts engageable by wiper 162 in the manner previously described, to transmit the digitizer manifestation (i.e., the number of contacts closed in bank D1–D20) when hopper 14 is loaded. The additional contacts TC1 to TC21 inclusive engageable by wiper 236 transmit the digitizer position after the draft in hopper 14 is discharged but before the next draft is admitted as will presently become apparent.

With the circuitry thus far described, it is clear that energization of solenoid WR-SD and of relay Z-T is simultaneous. As a result, counterweight 52 is removed from weighbeam 29 and a short time thereafter relay Z-T times out to close contacts Z-T1. By removing counterweight 52, only the tare weight 50 is left on weighbeam 29 to balance the weight of hopper 14 and any material therein. Thus, when counterweight 52 is removed after the draft is discharged and no residue is left in hopper 14, weighbeam 29 assumes a balanced position. If, however, residue is left in hopper 14 and counterweight 52 is removed, weighbeam 29 will be deflected in an overbalancing direction by a magnitude equivalent to the weight value of the residue. This overbalancing displacement of weighbeam 29 from its balanced position causes actuator bar 100 of digitizer 84 to be displaced by a corresponding magnitude, thus permitting a predetermined number of contacts in bank D1–D20 to close. The number of contacts in banks D1–D20 closed will represent the weight value of the residue in weigh hopper 14 in pounds in the same manner as digitizer 84 was utilized to detect the weight value of the overbalance when weigh hopper 14 was loaded.

Assuming that there are four pounds of residue left in hopper 14 after the draft is discharged, the displacement of weighbeam 29 resulting from the removal of counterweight 52, allows contacts D1, D2, D3 and D4 to close. When wiper 236 is now stepped from its home position at terminal TC21, relay X-C remains energized as wiper 236 sequentially engages each terminal TC1, TC2, TC3 and TC4 since contacts D1, D2, D3 and D4 connected to contacts TC1, TC2, TC3 and TC4 complete a circuit through the operating coil of relay X-C. When wiper 236 is stepped to the next contact TC5, relay X-C will be de-energized since contacts D5 are open.

As shown in FIGURE 12, relay X-C has a set of normally open contacts X-C2 and a set of normally closed contacts X-C1. Contacts X-C1 are arranged in series with contacts Z-T3 and a residue timer relay X-T so that energization of relay X-C closes contacts X-C1 to complete a circuit to energize timer relay X-T. Timer relay X-T has a set of time delay contacts X-T1 which close after a short delay.

With continued reference to FIGURE 12, contacts X-T1 are arranged in series with a residue latch relay X-L so that closing of contacts X-T1 will energize latch relay X-L. Relay X-L has two sets of normally closed contacts X-L1, and X-L2 and three sets of normally open contacts X-L3, X-L4 and X-L5. Energization of latch relay X-L opens contacts X-L1 and X-L2 and closes contacts X-L3, X-L4 and X-L5, thus transferring contacts X-L1, X-L2, X-L3, X-L4 and X-L5 to opposite positions from that shown in the drawings where they are latched in place until a residue latch release relay X-U (FIGURE 12) is energized as will be presently explained in detail.

Contacts X-L1 are arranged in stepper network 202 across terminals 204 and 206 of bridge 196 in series with impulse timer relay C-T and with contacts Z-T2, X-C2, D-L2 and S-C2. Contacts Z-T2 and X-C2 are in parallel with contacts S-T2 and R-C2, thus providing two separate energizing circuits for timer relay C-T. One circuit may be traced from terminal 204, through contacts S-T2, R-C2, X-L1, D-L2, S-C2 and through the operating coil of relay C-T to terminal 206. This circuit, as will presently become apparent, is utilized to advance wiper 162 from its "home" position at contact S21 to a position in bank S1–S21 coinciding with the last set of hot contacts in digitizer bank D1–D20 to be closed.

The other circuit paralleling the circuit through contacts S-T2 and R-C2 may be traced from terminal 204, through contacts Z-T2, X-C2, X-L1, D-L2, S-C2 and through the operating coil of relay C-T to terminal 206. This circuit as will presently become apparent, is utilized to advance wiper 236 from its "home" position at TC21 in bank TC1–TC21 to a position coinciding with the first set of contacts in bank D1–D20 remaining open under the control of actuator bar 100.

Contacts X-L4 are also arranged in stepper network 202 in parallel with contacts T-T2 and in series with contacts W1 thus providing a further circuit for energizing timer relay C-T in parallel relation to the circuit through contacts T-T2.

Contacts X-L3 are arranged in parallel with contacts D-L4 and in series with counter solenoid U-SD so that the closing of either set of contacts D-L4 or X-L3 can complete a circuit for energizing counter solenoid U-SD. Thus, one circuit for energizing solenoid U-SD may be traced from line 66 through contacts D-L4, through contacts S-C1 and through the operating coil of solenoid U-SD to line 68. This circuit enables the impulsing of solenoid U-SD to count in the overbalance as previously described in the embodiment of FIGURES 1–9. Alternately, a circuit for energizing solenoid U-SD may be traced from line 66 through contacts X-L3, through contacts S-C1 and through the operating coil of solenoid U-SD. This circuit, as will presently become more apparent, enables the impulsing of solenoid U-SD to count in a value representative of the weight of any residue left in hopper 14 after the draft is discharged.

Contacts X-L2 of latch relay X-L are arranged across lines 66 and 68 in series with contacts X-L3 and also in series with counter solenoid T-SD and timer delay T-T. By means of this circuitry, contacts X-L2, which open when contacts X-L3 close, prevents energization of counter solenoid T-SD while contacts X-L3 are latched closed and thus permits energization of solenoid T-SD only through contacts D-L4 in the manner described in the embodiment of FIGURES 1–9.

As shown in FIGURES 12 and 13, contacts X-L5 are arranged in series with empty latch release relay E-U and with a set of contacts W3. Contacts W3 are operatively engaged by follower 212 to be actuated by cam 210 along with contacts W1 and W2. When wipers 162 and 236 are in contact with terminals S21 and TC21 respectively, contacts W3 are closed by cam 210, while contacts W1 and W2 are respectively opened and closed as previously described in the embodiment of FIGURES 1–9. Concomitantly with stepping wiper 236 to contact TC21, contacts W3 will close enabling a circuit to be completed for energizing latch release relay E-U provided that contacts X-L5 are closed.

Energization of latch release relay E-U unlatches contacts E-L1, E-L2, E-L3 and E-L4 and thus transfers contacts E-L1, E-L2, E-L3 and E-L4 to their respective positions illustrated in the drawings. By releasing contacts E-L3 to opened position, solenoid WR-SD is de-energized to again set counterweight 52 on beam 29. The release of contacts E-L1 (FIGURE 11) to closed position conditions the circuit for another feeding cycle by energizing feed delay timer relay F-T. The release of contacts E-L3 to open position assures the de-energization of discharge valve solenoid D-SD before the next feeding cycle begins.

Contacts E-L4 (FIGURE 12) when released by relay E-U assume a closed position as previously mentioned to complete a circuit for energizing residue latch release relay X-U arranged across liner 66 and 68 in series with contacts E-L4, W3 and X-L5. Thus, whenever contacts X-L5 are latched closed, the closing of contacts W3 by moving wipers 162 and 236 to their "home" positions at terminals S21 and TC21 will cause relay E-U to be energized which, in turn, causes relay X-U to be energized by releasing contacts E-L4 to closed position.

By energizing latch release relay X-U, contacts X-L1, X-L2, X-L3, X-L4 and X-L5 are unlatched and allowed to assume their respective positions illustrated in the drawings.

In the embodiment illustrated in FIGURE 10-13, the weight value of counterweight 52 is selected to be a predetermined magnitude greater than the counter digit wheel driven independently by counter solenoid T-SD by an amount corresponding to the range of digitizer 84 for a purpose as will presently appear. Thus, where the thousandths order counter wheel 172 is independently advanced one digit with the introduction of each balancing draft into hopper 14, the weight value of counterweight 52 is selected to be 1020 pounds. As a result, a load of 1020 pounds representing the nominal capacity of hopper 14 is required to balance counterweight 52. The numerical difference between the 1020 pound weight value of counterweight 52 and the plural order digit of 1000 registered as a result of introducing a balancing load into hopper 14, therefore, is 20 which is equal to the number of contacts in digitizer bank D1–D20.

In the standby de-energized condition of the control and sequencing circuit illustrated in FIGURES 11-13, gates 19 and 20 are closed and the counterweight solenoid WR-SD is de-energized allowing counterweight 52 to be supported from weighbeam 29. With counterweight 52 on weighbeam 29, beam 29 is swung downwardly to its unbalanced rest position on stop 62 illustrated in FIGURE 10. In this unbalanced position of weighbeam 29 as previously explained, actuator bar 100 of digitizer 84 is raised to open all of the contacts in bank D1–D20. Wipers 162 and 236 are positioned in this standby de-energized circuit condition on terminals S21 and TC21 respectively so that contacts W1 are open and contacts W2 and W3 are closed.

To start operation of the system illustrated in FIGURES 10–13, switches 70 and HR-S are closed. If empty latch relay contacts E-L1 are closed, feed delay timer relay F-T will be energized. Contacts E-L1 will be closed if the empty latch release relay E-U has been previously energized to release contacts E-L1. The closing of contacts E-L1 by energization of empty latch release relay E-U assures that the residue in hopper 14 has been counted in and further that wipers 162 and 236 have been returned to their respective terminals S21 and TC21 in the two levels of stepper banks.

By energizing feed delay timer relay F-T, contacts F-T1 will close after a short time delay to permit the system to stabilize following the count in of any residue in hopper 14. This stabilizing time assures that weighbeam 29 has come to its rest position on stop 62 before feed gate 19 is opened.

By closing contacts F-T1, the feed gate air valve solenoid FG-SD will be energized if contacts F-C1 are closed. contacts F-C1 will be closed if contacts D1 of digitizer 84 are open. Contacts D1 will be open when weighbeam 29 is at its unbalanced rest position on stop 62. Weighbeam 29, in turn, is at its unbalanced rest position on stop 62 only when counterweight 52 is supported from beam 29 and hopper 14 is empty.

Energization of feed gate solenoid FG-SD actuates valve 78 to supply pressurized air to cylinder 22 for opening feed gate 19. By opening feed gate 19, material begins to feed into hopper 14 from bin 10 in the manner previously described. While material is being fed to weigh hopper 14 up to amounts less than 1020 pounds, weighbeam 29 remains at its rest position on stop 62. Consequently, there is no movement of weighbeam 29 or of actuator bar 100 until the load in weigh hopper 14 balances counterweight 52. Contacts D1–D20 inclusive, therefore, will remain open until a balanced load of 1020 pounds has been introduced into weigh hopper 14 as previously described in the embodiment of FIGURES 1–9.

Thus, the feeding cycle will continue until this balanced condition is secured. As soon as the balanced condition is secured by introducing 1020 pounds of material into weigh hopper 14, counterweight 52 is balanced to initiate movement of weighbeam 29 in a clockwise direction (as viewed from FIGURE 10) to a balanced position.

Concomitantly with the movement of weighbeam 29, actuator bar 100 will begin to lower. With the introduction of the first pound of overbalance, contacts D1 close before the remaining contacts in the bank D1–D20 are progressively closed. By closing contacts D1 as previously described in the embodiment of FIGURES 1–9, feed stop relay F-C will be energized thus opening contacts F-C1 and closing contacts F-C2 to respectively de-energize feed gate solenoid FG-SD and to energize the stabilizing timer relay S-T.

By de-energizing solenoid FG-SD, feed gate 19 will begin to close. During the time in which feed gate 19 is closing, an additional amount of material will enter hopper 14 in excess of the load in the hopper at which a balanced condition was secured. For the purpose of describing the operation of the embodiment illustrated in FIGURES 10–13, it will be assumed that the additional amount of material entering weigh hopper 14 in excess of the balancing load is 4 pounds. Thus, the weight value of the draft in weigh hopper 14 at the time feed gate 19 is fully closed will be 1024 pounds.

With 1024 pounds of material in weigh hopper 14, weighbeam 29 is moved in an overbalancing direction by a distance corresponding to the additional 4 pounds to cause actuator bar 100 to be lowered by a corresponding distance, permitting contacts D1, D2, D3 and D4 to be progressively closed with contacts D5 to D20 inclusive remaining open. Closing of contacts D1, as previously mentioned, causes energization of stabilizing timer relay S-T through contacts F-C2 which were closed as a result of energizing relay F-C. After a short time delay following energization of relay S-T, which is concomitant with the deenergization of feed gate solenoid FG-SD, contacts S-T1 and S-T2 are closed. This time delay as described in the embodiment illustrated in FIGURES 1–9, is sufficiently long to allow weighbeam 29 to come to a rest position after all the material has entered weigh hopper 14.

By closing contacts S-T2, stepper network 202 is activated to energize impulse timer relay C-T which impulses stepper coil S-C to automatically advance wipers 162 and 236 through a self-interrupting action in the manner previously explained. Wipers 162 and 236 being mounted on the same shaft will advance together and will always reach "home" position at contacts S21 and TC21 respectively at the same time. During the impulsing of stepper coil S-C through contacts S-T2, however, no circuit will be completed for energizing relay X-C since contacts Z-T1 are open.

With each discrete impulse of stepper coil S-C, wiper 162 will be advanced one step forward beginning from its "home" position at contact S21 and advancing first to contact S1 and then to contact S2 and so on. With contacts D1–D4 inclusive closed and contacts D5–D20 inclusive open, wiper 162 will be automatically advanced from contact S21 through contacts S1–S16 inclusive. When wiper 162 is advanced, the next step to contact S17, thus reaching coincidence with the first shorted digitizer position represented by contact D4, a circuit is completed for energizing relay R-C through closed contacts D4, wiper 162 and contacts S-T1, which were closed by energization of the stabilizing timer relay S-T.

By energizing relay R-C, the stepper network 202 is immediately de-activated by the opening of contacts R-C2 to interrupt the circuit to timer relay C-T and to stepper coil S-C. As a result, the advancement of wiper 162 is arrested with wiper 162 remaining on contact S17 in the same manner as described in the embodiment illustrated in FIGURES 1–9.

Energization of the relay R-C also closes contacts R-C1 to energize relay R-T. After a short delay following energization of relay R-T, contacts R-T1 will close causing the discharge latch relay D-L to be energized to transfer contacts D-L2, D-L3, D-L4, D-L5 and D-L6 to opposite positions from that shown in the drawings. By opening contacts D-L2, the stepper advance network 202 is locked out to insure that wiper 162 remains at its coincidence position on contact S17 before allowing the scale to discharge.

Closing of contacts D-L4 energizes solenoid T-T to impulse counter solenoid T-SD once thereby advancing the thousandth order counter wheel 172 by a single count or digit as previously described to manifest a weight value of 1000 pounds on counter 65. At this point in the operation, it will be appreciated that the plural order digit registered by counter 65 is a predetermined magnitude less than the actual weight value of the load in weigh hopper 14 at which a balanced condition was secured by an amount equal to the digitizer range or more particularly the number of digitizer contacts in digitizer 84. By closing contacts D-L4, the circuit for impulsing counter solenoid U-SD is conditioned for counting in the four pound overbalance.

With wiper 162 still maintained at the position coinciding with the digitizer position indicated by closed contacts D4, discharge air valve solenoid D-SD is energized as a result of closing contacts D-L3. This starts the removal of the 1024 pound draft from weigh hopper 14. When impulse solenoid T-T times out, contacts T-T1 are opened for removing the impulse from counter solenoid T-SD and contacts T-T2 are closed to complete a circuit for re-energizing timer delay relay C-T to count in the overbalance of 4 pounds.

As a result, wiper 162 is now advanced from its coincidence position on contact S17 toward its home position at contact S21. With each of the four impulses required to advance wiper 162 to its home position at contact S21, contacts S-C1 will be alternately closed and opened, thus impulsing counter solenoid U-SD four times to advance counter wheel 178 by four digits. As a result, an addend of 4 is added to the augend of 1000 previously registered by the single impulse of solenoid T-SD to now manifest a sub-total of 1004 on counter 65. When wiper 162 reaches its home position at contact S21, contacts W1 are opened by cam 210 to de-energize timer relay C-T and stepper coil S-C thereby de-activating the stepper network 202 to prevent further advancement of wiper 162 beyond contact S21 as previously described in the embodiments illustrated in FIGURES 1–9.

Upon the removal of the first four pounds from hopper 14, as previously explained, contacts D1, D2, D3 and D4 will all open by the resulting movement of weighbeam 29. By opening contacts D1, relay F-C is de-energized to open contacts F-C2 and to close F-C1. With discharge gate 20 still open, however, discharge limit switch DG-LS1 is opened thus assuring that feed gate solenoid FG-SD is not prematurely energized. By opening contacts F-C2, stabilizing timer relay S-T is de-energized to open contacts S-T1 for de-energizing relay R-C. De-energization of relay R-C opens contacts R-C1 to de-energize relay R-T.

De-energization of relay R-T opens contacts R-T1 to de-energize the latching relay D-L. Contacts D-L2, D-L3, D-L4, D-L5 and D-L6, however, are all latched in the positions opposite to that shown in the drawings thus permitting the de-energization of relay D-L without causing a change in the position of these contacts.

As a result of having closed contacts D-L5 by initially energizing discharge latch relay D-L, empty latch relay E-L is energized to transfer contacts E-L1, E-L2, E-L3 and E-L4 to positions opposite from that shown in the drawings and to latch them in place. By opening contacts E-L1, energization of feed gate solenoid FG-SD is prevented when contacts F-C1 are closed again as a result of opening contacts D1.

When relay R-T is de-energized to open contacts R-T1, empty latch relay E-L is de-energized along with discharge latch relay D-L. However, contacts E-L1, E-L2, E-L3 and E-L4 remain in their positions opposite that illustrated in the drawings since they are latched in place and can only be released by energization of empty latch release relay E-U.

Discharge timer relay D-T is set to allow a sufficient time delay for removing all of the material from weigh hopper 14. When discharge timer relay D-T times out to close contacts D-T1 and wiper 162 again reaches its home position at contact S21 to close contacts W2, indicating that the count in of the four pound overbalance has been completed, a circuit is completed for energizing the discharge latch release relay D-U. By energizing discharge latch release relay D-U, contacts D-L2, D-L3, D-L4, D-L5 and D-L6 are all unlatched thus permitting these contacts to be transferred back to their respective positions illustrated in the drawings. By opening contacts D-L3, discharge gate solenoid D-SD is de-energized to close discharge gate 20. By closing contacts D-L2, the circuit for energizing stepper impulse timer relay C-T is again conditioned, although relay C-T is not energized since contacts S-T2 are open.

With contacts D-L6 now closed and with contacts E-L3 still latched in closed position, a circuit is completed for energizing the weight removal solenoid WR-SD and the empty stabilizing timer relay Z-T. As a result of energizing weight removal solenoid WR-SD, counterweight 52 is removed from weighbeam 29 leaving only tare weight 50 to balance the weight of weigh hopper 14 and any residue remaining in hopper 14 after discharge gate 20 has been closed. For the purpose of describing the operation of the embodiment illustrated in FIGURES 10–13, it will be assumed that a residue of 8 pounds is left in weigh hopper 14 after discharge gate 20 is closed. Consequently, the weight value of the draft removed from weigh hopper 14 will be 1016 pounds of which 1004 pounds have already been registered on counter 65.

Since tare weight 50 has a weight value for counterbalancing only the weight of the weigh hopper itself, then the residue of 8 pounds left in hopper 14 will cause weighbeam 29 to be deflected in an overbalancing direction by a distance equivalent to the 8 pound residue present in the hopper. This movement of weighbeam 29 in response to the 8 pound residue displaces actuator bar 100 of digitizer 84 in a downward direction as viewed from the drawings to allow digitizer contacts D1–D8 inclusive to close with the remaining digitizer contacts D9–D20 inclusive remaining held in open position by actuator bar 100.

Empty stabilizing timer relay Z-T will time out after a short time delay to close contacts Z-T1 and Z-T2. This time delay is sufficient to allow the system to stabilize and for weighbeam 29 to come to rest after discharge gate 20 is closed, thus insuring that the required number of digitizer contacts have been closed to manifest the amount of residue in hopper 14.

By closing contacts Z-T1, a circuit is completed for energizing relay X-C. This circuit may be traced from line 66 to contact TC21, through wiper 236, through contacts Z-T1, through the operating coil of relay X-C to line 68. With contacts Z-T2 closed, the energization of relay X-C closes contacts X-C2 to complete a circuit for energizing stepper impulse timer relay C-T. As a result of energizing relay C-T, the stepper network is activated once again to advance wipers 162 and 236 with a self-interrupting action starting from the respective home positions at terminals S21 and TC21 in the manner previously explained. With each impulse of stepper coil S-C through the operation of contacts S-C2 and contacts C-T1, wiper 236 is advanced from contact TC21 first to contact TC1 and then to contact TC2 and so on.

By sequential engagement of wiper 236 with contacts TC1–TC8 inclusive, relay X-C will remain energized to maintain contacts X-C2 closed for continuing the advancement of wiper 236 since contacts TC1–TC8 inclusive are connected to digitizer contacts D1–D8 inclusive which have been closed as a result of movement of weighbeam 29 due to the 8 pound residue in weigh hopper 14. When wiper 236 is advanced to contact TC9, however, the circuit for maintaining relay X-C energized is interrupted since contact TC9 is connected to the first set of open contacts D9 in the digitizer bank D1–D20. As a result, as soon as wiper 236 reaches contact TC9 coinciding with the first open position in the digitizer bank D1–D20, relay X-C is de-energized to open contacts X-C2.

By opening contacts X-C2, the circuit for energizing relay C-T and stepper coil S-C is temporarily interrupted to prevent further advancement of wiper 236. Consequently, wiper 236 will remain on contact TC9 until stepper coil S-C is impulsed through another circuit in the stepper network.

As a result of de-energizing relay X-C, contacts X-C1 are closed to complete a circuit through contacts Z-T3 to energize residue timer relay X-T. Energization of relay X-T closes contacts X-T1 after a short time delay which completes a circuit for energizing a residue latch relay X-L.

By energizing residue latch relay X-L, contacts X-L1, X-L2, X-L3, X-L4 and X-L5 are all transferred to positions opposite from that shown in the drawings and latched in place until residue latch release relay X-U is energized. The opening of contacts X-L1 locks out the parallel stepper network circuits through contacts Z-T2 and through contacts S-T2 to thereby insure that wiper 236 remains at its position on terminal TC9 in coincidence with the first open position in digitizer bank D1–D20. By closing contacts X-L4, a new circuit for energizing relay C-T is completed to facilitate advancement of wiper 236 towards its home position at contact TC21. This circuit may be traced from terminal 204 through contacts X-L4, through contacts W1, through contacts S-C2, and through the operating coil of timer relay C-T to terminal 206 with contacts W2 being closed as a result of having advanced wiper 236 off its home position at terminal TC21.

As a result, wiper 236, having assumed a position displaced from its home position by a number of steps as determined by the digitizer position, will now begin stepping towards its home position at contact TC21.

With each step of wiper 236 towards its home position at contact TC21, units solenoid U-SD will be impulsed through a circuit established by the closing of contacts X-L3 and the intermittent closing of contacts S-C1. It is now evident that the number of impulses imparted to solenoid U-SD and, consequently, the addend added to the augend will be equal to the difference between the number of contacts in digitizer bank D1–D20 and the weight value of the residue in weigh hopper 14. Thus, where 8 pounds of residue has remained in weigh hopper 14 after discharge gate 20 has closed, solenoid U-SD will be impulsed 12 times to add an addend of 12 to the augend of 1004 thus manifesting a total of 1016 pounds on counter 65. The total of 1016 pounds is the actual amount of material removed from weigh hopper 14.

Consequently, it is apparent from the foregoing that by initially manifesting a plural order number which is a predetermined magnitude less than the actual weight of the load at which a balanced condition was secured, the difference between this predetermined magnitude and the weight value of the residue may be added to the manifested number to account for the weight of the residue remaining in weigh hopper 14. Thus, in the present embodiment where the plural order number registered was 1000 and the weight of the load at which a balanced scale condition was secured was 1020 pounds, then the difference between 1020 and 1000 amounts to 20 units which is equal to the number of contacts in digitizer band D1–D20. Therefore, the amount actually added to the count of 1020 pounds, at which a balanced scale condition was secured, is: 1020 minus 20 (representing the initial manifestation of 1000) plus 20 minus 8 (representing the residue remaining in weigh hopper 14), plus 4 which was added to account for the 4 pound overbalance. As a result it is readily apparent from the foregoing that the two values of "20" will cancel each other out leaving a total of four units to be added for the overbalance and a total of eight units of residue to be deducted from the actual weight of 1020 at which a balanced condition was secured.

Thus with the foregoing it is apparent that the count in for overbalance and for residue is accomplished entirely by addition without any subtraction whatever, thus permitting counter 65 to be of a simplified form performing only additive functions.

As wiper 236 is being stepped towards its home position at contact TC21, wiper 162 also is stepped towards its home position. However, this has no effect in the system since contacts S-T1 are open to preclude energization of relay R-C. When wiper 236 again reaches its respective home position at contact TC21, contacts W3 will close under the operation of cam 210 to energize empty latch release relay E-U through closed contacts X-L5. Energization of latch release relay E-U transfers contacts E-L1, E-L2, E-L3 and E-L4 to the positions illustrated in the drawings.

By closing contacts E-L4, residue latch release relay X-U is energized through the closed contacts X-L5 and W3 to unlatch contacts X-L1, X-L2, X-L3, X-L4 and X-L5 for transfer back to the positions illustrated in the drawings. Opening of contacts E-L3 de-energizes weight removal solenoid WR-SD to place counterweight 52 on weighbeam 29 preparatory to the feeding of the next draft. Opening of contacts E-L3 also de-energizes empty stabilizing timer relay Z-T to open contacts Z-T1, Z-T2 and Z-T3.

With counterweight 52 now on weighbeam 29, weighbeam 29 is displaced to its unbalanced position at rest on beam stop 62. Opening of contacts E-L2 assures that discharge valve solenoid D-SD is de-energized to insure that discharge gate 20 is closed preparatory to the feeding of the next draft. Thus, it will be appreciated that energization of relay E-U is accomplished only when contact X-L5 has been latched closed by energization of relay X-L and by advancement of wipers 162 and 236 to their respective home positions on terminals S21 and TC21 for closing contacts W3. As a result of this action, the closing of contacts E-L1 by energization of relay E-U assures that the residue in hopper 14 has been counted in and further that wipers 162 and 236 have been returned to their respective terminals S21 and TC21 preparatory to the introduction of the next draft. Thus with the unlatching of contacts E-L1 to closed position by energization of release relay E-U, the circuit is now prepared for a further feeding cycle which is repeated in the manner described above.

FIGURES 14–18 inclusive illustrate a further embodiment of the present invention in which two digitizers 300 and 302 are employed to eliminate the necessity of removing the counterweight from the beam for weighing the residue left in the weigh hopper after the draft is discharged. Digitizers 300 and 302 are of the same construction as digitizer 84 described in the previous embodiments with digitizer 300 being arranged in the system to indicate the amount of overbalance when the weigh hopper is loaded and with digitizer 302 being arranged in the system to indicate the amount of residue in the weigh hopper after the draft is discharged.

To readily distinguish the component parts of digitizers 300 and 302, the components of digitizers 300 and 302 are designated by the same reference numerals used in the embodiments of FIGURES 1–13 with the reference characters for digitizers 302 being suffixed with a "″." Other components of the embodiment illustrated in FIGURES 14–18 which correspond to identical parts in the embodiments of FIGURES 1–13 are designated by the same reference numerals.

With reference now to FIGURE 14, weigh hopper 14 is suspended from a modified compound weighbeam assembly indicated at 304. Weighbeam assembly 304 comprises an upper weighbeam 306 and a lower weighbeam 308. Mounted on weighbeam 308 at opposite ends thereof are knife edges 309 and 310 with weighbeam 308 being supported by a fixedly secured hanger 312 engaging a knife edge 309 and by a hanger member 314 engaging a knife edge 310. Hanger member 314 is pivotally carried on a knife edge 318 fixed to weighbeam 306 intermediate its ends in the manner shown. The right-hand end of weighbeam 306, as viewed from FIGURE 14, is supported from a fixedly secured hanger 320 which engages a knife edge 322 carried by beam 306 near the right-hand end thereof.

Weigh hopper 14 is suspended from weighbeam assembly 304 by a pair of hangers 324 and 326. Hanger 324 engages a knife edge 328 carried by weighbeam 308 between knife edges 312 and 316. Hanger 326 engages a knife edge 330 fixed to weighbeam 306 to the left of knife edge 322 as viewed from FIGURE 14. The left-hand end of weighbeam 306, as viewed from FIGURE 14, is supported from an intermediate beam member 332 by means of a hanger member 334 which engages a knife edge 336 fixed to weighbeam 306. Hanger member 334 is carried by a knife edge 338 fixed to beam member 332 between the ends thereof. Beam member 332 is suspended from a full balance weighbeam 340 and an empty balance weighbeam 342 by means of a pair of hangers 344 and 346 respectively. Hanger 344 engages a knife edge 348 fixed to beam member 332 to the left of knife edge 338 and hanger 346 engages a knife edge 350 fixed to beam member 332 to the right of knife edge 338 as viewed from FIGURE 14. Hangers 344 and 346 respectively are carried by knife edges 352 and 354 which are fixed to adjacently disposed ends of weighbeams 340 and 342.

Weighbeam 340 is supported by a fixedly secured hanger 356 which engages a knife edge 358 fixed to weighbeam 340 to the left of knife edge 352 as viewed from FIGURE 14. Suitably secured to the end of weighbeam 340 opposite from the end of weighbeam 340 on which knife edge 352 is mounted, is the motion transmitting linkage 128 of digitizer 300. Between the connection of linkage 128 of digitizer 300 and knife edge 358, a knife edge 360 is fixed to beam 340 and carries a hanger 362 which supports a tare weight 364 and a counterweight 366. Between knife edge 358 and knife edge 360, beam 340 is connected to a dashpot 368 of conventional construction to dampen the movement of weighbeam 340. Adjacent to the left-hand end of weighbeam 340 and approximately vertically below the connection of linkage 128 of digitizer 300, is a fixed beam stop 370 which limits counterclockwise pivotal movement of weighbeam 340 about knife edge 358.

With continuing reference to FIGURE 14, weighbeam 342 is supported from a fixedly secured hanger 372 which engages a knife edge 374 fixed to beam 340 to the right of knife edge 354. Suitably secured to the end of weighbeam 342 opposite from that end carrying knife edge 354 is the motion transmitting linkage 128″ of digitizer 302. A tare weight 376 is suspended from weighbeam 342 by means of a hanger 378 which engages a knife edge 380 fixed to weighbeam 342 between the connection of linkage 128″ for digitizer 302 and knife edge 374 in the manner shown. Between knife edge 374 and knife edge 380, dashpot 382 of conventional form is connected to weighbeam 342 to dampen the movement of beam 342 in a manner similar to the cooperation of dashpot 368 with weighbeam 340. Adjacent the right-hand end of weighbeam 342 and near the connection of linkage 128″ for digitizer 302 is a fixed beam stop 384 which limits counterclockwise pivotal displacement of weighbeam 342.

With the foregoing weighbeam structure, the load transmitted to weighbeam 306 is balanced either by counterweight 366 together with tare weight 364 on beam 340 or by tare weight 376 on beam 342. When weigh hopper 14 is filled to nominal capacity, weighbeam 340 is pivoted about knife edge 358 to a generally horizontal balancing position shown in the drawings with counterweight 366 and tare weight 364 balancing the load introduced into weigh hopper 14 and the weight of the weigh hopper. Since weigh beam 342 is counterbalanced only by tare weight 376, beam 342 will be displaced about its pivot at knife edge 374 under the application of force applied by the weight of material in weigh hopper 14 to a position where it abuts beam stop 384. Consequently, with weighbeam 342 abutting beam stop 384, only counterweight 366 and tare weight 364 operatively act through the weighbeam assembly to balance the load in weigh hopper 14 and the weight of the weigh hopper.

When weigh hopper 14 is empty, counterweight 366 will swing weighbeam 340 into abutment with beam stop 370 thus allowing only tare weight 376 on weighbeam 342 to balance the weight of weigh hopper 14 and any residue left in the hopper after a draft is discharged.

The reaction of the weight of weigh hopper 14 and any material therein is balanced by the pull on hangers 324 and 326 which is transmitted to weigh beam 306. The load transmitted to weighbeam 306 is transmitted to beams 340 and 342 through hangers 344 and 346 respectively.

In accordance with the present invention, the weight value of counterweight 366, corresponding to the nominal capacity of weigh hopper 14, is made to be greater than the plural order number registered by counter 65 for each draft of material by a magnitude equal to the number of contacts in digitizer 300. The highest order of plural order number registered by counter 65 for each draft as previously explained, is preferably a non-zero digit with the remaining lower order digits being zero digits. This enables the manifestation of this plural order number by means of a single impulse. Any overbalance of material introduced into weigh hopper 14 in excess of the balancing load will be manifested by the progressive closing of the contacts in bank D1–D20 of digitizer 300, starting with contacts D1 in the manner previously described.

For the purpose of describing the invention, the weight value of counterweight 366 is selected to be 1020 pounds thus making the nominal capacity of weigh hopper 14 1020 pounds in the manner described in the previous embodiments.

When the draft is removed from weigh hopper 14, the force exerted by counterweight 366 displaces beam 340 to an inoperative position in abutment with beam stop 370. As a result, only tare weight 376 on beam 342 is left to balance the weight of weigh hopper 14 and any residue left therein. If no residue remains, beam 342 assumes a generally balanced horizontal position in which the contacts in bank D1″–D20″ of digitizer 302 are open. Any residue remaining in weigh hopper 14 will shift weighbeam 342 in an overbalancing direction thus allowing the contacts in bank D1″–D20″ to progressively close starting with contacts D1″.

Digitizer 300 is arranged in the control and sequencing circuit in the same manner as digitizer 84 of the embodiments illustrated in FIGURES 1–13, with the common terminal 90 of digitizer 300 being connected to line 66 and with the flexible arm 98 of contacts D1 being connected to line 68 through the operating coil of feed stop relay F-C. The stepping switch mechanism indicated at 152 in FIGURE 15 is the same as that described in the embodiment of FIGURES 1–9, with wiper 162 being connected to line 68 serially through contacts S-T1 and through relay R-C. The stepper network for advancing wiper 162 also is the same as that described in the first embodiment illustrated in FIGURES 1–9. In view of the foregoing identical structures involved, further description of digitizer 300, stepping switch mechanism 152 and the stepper network 202 for mechanism 152 will not be described in this embodiment.

Digitizer 302 is arranged in the control and sequencing circuit with its common terminal 90″ connected to line 66. The contacts D1″–D20″ inclusive are respectively connected to terminals of stationary contacts T1–T20 inclusive of a further stepping switch mechanism indicated at 390 in FIGURES 16 and 18. Contacts T1–T20 inclusive are contained in a bank T1–T21 which also contain a contact T21 representing a "home" position and being electrically isolated from the contacts in digitizer bank D1″–D20″ of digitizer 302.

Switch mechanism 390, as shown in FIGURE 18, comprises the usual stepper coil which is indicated at 2S-C and which attracts an armature 392 when energized. A pawl 394 of conventional form is mounted on armature 392 and engages a ratchet wheel 396 carried by a rotatable shaft 398 which mounts a wiper 400. Wiper 400 is arranged to successively engage the contacts in stepper bank T1–T21 starting from its home position at contact T21 and advancing to contact T1 and thereafter through the remaining contacts in the bank in sequential order. Thus, it is clear that as stepper 2S-C is intermittently impulsed by means as will be presently described, armature 392 is attracted each time stepper coil 2S-C is energized to advance ratchet wheel 396 through the engagement of pawl 394. With each impulse of stepper coil 2S-C, wiper 400 advances one contact in bank T1–T21. Thus, when wiper 400 is in engagement with contact T21, an impulse of stepper coil 2S-C will advance wiper 400 to contact T1, and on the next impulse of stepper coil 2S-C, wiper 400 will advance from contact T1 to contact T2 and so on.

With continuing reference to FIGURE 16, wiper 400 is connected to line 68 in series with contacts Z-T1 of relay Z-T previously described and with relay X-C. With this circuitry, as previously described, relay X-C is energized when any of the contacts in digitizer bank D1″–D20″ are closed and wiper 400 is advanced to the contacts in stepper bank T1–T21 connected to the closed contacts in bank D1″–D20″ to complete a circuit through the operating coil of relay X-C provided contacts Z-T1 are closed. As shown in FIGURE 16, contact T21 is connected to line 66 so that when wiper 400 is at its home position on contact T21, relay X-C will be energized provided contacts Z-T1 are closed.

A rectifier bridge 406 having opposite sides is connected across lines 66 and 68 at terminals 408 and 410 for energizing stepper coil 2S-C. A stepper network 411 for impulsing stepper coil 2S-C is similar to stepper network 202 and is arranged across terminals 412 and 414 of bridge 406. Network 411 contains contacts Z-T2, X-C2 and X-L1 of relays Z-T, X-C and X-L previously described. Contacts Z-T2, X-C2 and X-L1 are arranged in series circuit relationship with stepper coil 2S-C and also with a stepper impulse timer relay 2C-T. Stepper coil 2S-C operates a set of normally closed contacts 2S-C2 arranged in series with timer relay 2C-T and in parallel with the stepper coil such that energization of stepper coil 2S-C will de-energize timer relay 2C-T. Relay 2C-T has a set of time delay normally open contacts 2C-T1 arranged in series with stepper coil 2S-C and in parallel with the operating coil of relay 2C-T. The operation of relay 2C-T and stepper coil 2S-C causes wiper 400 to advance with the usual self-interrupting action through the opening and closing of contacts 2S-C2 and 2C-T1 in the manner as previously described in the embodiments of FIGURES 1–13.

Stepper network 411 for switching mechanism 390 also includes contacts X-L4 of relay X-L previously described and a set of wiper shaft cam operated contacts 2W1 arranged across terminals 412 and 414 in series with relay 2C-T and coil 2S-C. Contacts X-L4 and 2W1 are in parallel with contacts Z-T2, X-C2 and X-L1 in the manner shown. By this circuitry, it is evident that closing of contacts Z-T2, X-C2 and X-L1 will complete one circuit for energizing relay 2C-T for advancing wiper 400 through the self-interrupting action previously described. Alternatively, impulse timer relay 2C-T may also be energized through a circuit established by the closing of contacts X-L4 and 2W1.

As shown in FIGURE 18, contacts 2W1 are actuated by means of a cam 418 mounted on shaft 398 and having a single rise 420 which reciprocates a follower 422. When the rise 420 of cam 418 lifts follower 422, contacts 2W1 are opened. Cam rise 420 is arranged to lift follower 422 only when wiper 400 is stepped to its "home" position at contact T21. As a result, contacts 2W1 are closed by stepping wiper 400 off contact T21 to any of the other contacts in bank T1–T21 in a similar manner described with respect to contacts W1 in the embodiment of FIGURES 1–13.

Also actuated by movement of follower 422 resulting from rotation of shaft 398 is a further set of contacts 2W2 (FIGURES 17 and 18) which are arranged in series with both the empty latch release relay E-U and with residue latch relay X-U and also in series with contacts X-L5 across line 66 and 68. Contacts 2W2 are arranged to be closed by cam 418 when wiper 400 reaches its "home" position at contact T21. When wiper 400 is advanced off contact T21 to any of the other contacts in bank T1–T21, contacts 2W2 will open, thus interrupting the circuit to relays E-U and X-U.

Stepper coil 2S-C also operates a set of contacts 2S-C1 which are normally opened when no current is passing through coil 2S-C. Contacts 2S-C1 are arranged across lines 66 and 68 in series with contact X-L3 and with counter solenoid U-SD to facilitate the impulsing of solenoid U-SD in counting in the difference between the number of contacts in bank D1′–D20′ of digitizer 302 and the weight of residue left in weigh hopper 14 after the draft is discharged.

With continued reference to FIGURE 17, contacts X-L2 of relay X-L are arranged in parallel with contacts X-L3 and 2S-C1 and in series with counter solenoid U-SD and also in series with contacts S-C1 and D-L4. As a result, when relay X-L is energized allowing counter solenoid U-SD to be impulsed by the actuation of contacts 2S-C1, the circuit through contacts D-L4 and S-C1 is interrupted by contacts X-L2.

As shown in FIGURE 16, contact T21 of stepper bank T1–T21 is connected to line 66. Wiper 400 is connected to line 68 in series with relay X-C and contacts Z-T1. As a result, when wiper 400 is at its home position on contact T21, relay X-C is energized provided contacts Z-T1 are closed.

As will presently become more apparent in the description of the operation of the circuit illustrated in FIGURES 15–17, digitizer 302 replaces the counterweight removal solenoid WR-SD described in the embodiment of FIGURES 10–13 and omitted from the circuitry in FIGURES 15–17. Thus, as shown in FIGURE 17, relay Z-T is connected across lines 66 and 68 in series with contacts E-L3 and D-L6. The remainder of the circuitry illustrated in FIGURES 15–17 is the same as that described in the embodiment of FIGURES 10–13 and consequently need not be further described.

To start operation of the system illustrated in FIGURES 14–18, switches 70 and HR-S are closed as previously described. If empty latch relay contacts E-L1 are closed, feed delay timer relay F-T will be energized. By energizing feed delay time relay F-T, contacts F-T1 will close after a short time delay, permitting the system to stabilize following the manifestation of any residue in hopper 14. This stabilizing time, in a manner as previously explained in the embodiment of FIGURES 10–13, assures that the components of weighbeam assembly 304, has come to a stabilized rest position before the feed gate 19 is opened.

By closing contacts F-T1, the feed gate air valve solenoid FG-SD will be energized provided contacts F-C1 are closed. Contacts F-C1 will be closed if contacts D1 of digitizer 300 are open. Contacts D1 of digitizer 300 will be open when full balance weighbeam 340 is at its unbalanced rest position on beam stop 370, thus indicating that hopper 14 is unloaded.

Energization of feed gate solenoid FG-SD actuates valve 78 to supply pressurized air to cylinder 22 for opening feed gate 19. By opening feed gate 19, material begins to feed into hopper 14 from bin 10, in the manner previously described.

The weight value of counterweight 366 for balancing the load introduced into hopper 14 is selected to be a predetermined magnitude greater than the multi-digit number registered as a result of impulsing counter solenoid T-SD. This predetermined magnitude is required to be numerically equivalent to the range of digitizer 300 for the same purpose as explained in the embodiment illustrated in FIGURES 10–13. In the embodiment of FIGURES 14–18, the weight value of counterweight 366 is also selected to be 1020 lbs. As a result, a load of 1020 pounds, representing the nominal capacity of weight hopper 14, is required to balance counterweight 366. The numerical difference between the 1020 pound weight value of counterweight 366 and the plural order digit of 1000, registered as a result of introducing a balancing load into weigh hopper 14, therefore, is 20 which is equal to the number of contacts in digitizer bank D1–D20 of digitizer 300.

Thus, while material is being fed to weigh hopper 14 up to amounts less than 1020 pounds, weighbeam 340 will remain at its rest position on beam stop 370. Consequently, there is no movement of actuator bar 100 of digitizer 300 and, as a result, all of the contacts in digitizer bank D1–D20 of digitizer 300 will remain open until a balanced load of 1020 pounds has been introduced into weigh hopper 14.

As soon as the balance condition is secured by introducing 1020 pounds of material into weigh hopper 14, movement of weighbeam 340 to its balanced position is initiated. Movement of weighbeam 340 causes concomitant downward displacement of actuator bar 100 of digitizer 300 in the same manner as described in the previous embodiments.

With the introduction of the first pound of overweight, contacts D1 will close before the remaining contacts in digitizer bank D1–D20 of digitizer 300 are progressively closed. By closing contacts D1 of digitizer 300, feed stop relay F-C will be energized in a similar manner as described in the embodiments of FIGURES 1–13. Thus contacts F-C1 are opened and contacts F-C2 are closed to respectively de-energize feed gate solenoid FG-SD and energize the stabilizing timer relay S-T. By de-energizing solenoid FG-SD feed gate 19 will begin to close.

As previously mentioned, during the time in which feed gate 19 is closing, an additional amount of material will enter hopper 14 in excess of the load in the hopper at which a balanced condition was secured. For the purpose of describing the operation of this embodiment illustrated in FIGURES 14–18, it will be assumed that the additional amount of material entering weigh hopper 14 exceeds the balancing load by 4 pounds. Thus, the weight value of the draft in weigh hopper 14 at the time feed gate 19 is fully closed will be 1024 pounds.

With 1024 pounds of material in weigh hopper 14, weighbeam 340 is moved in an overbalancing direction by a distance corresponding to the additional 4 pounds to cause actuator bar 400 of digitizer 300 to be lowered by a corresponding distance, thus permitting contacts D1, D2, D3, and D4 of digitizer 300 to be progressively closed with contacts D5 to D20 inclusive remaining open.

Closing of contacts D1 as previously mentioned, causes the energization of stabilizing timer relay S-T through contacts F-C2. After a short time delay following the energization of relay S-T, which is concomitant with the de-energization of feed gate solenoid FS-SD, contacts S-T1 and S-T2 are closed. This time delay, as described in the previous embodiment, is sufficiently long to allow the weighbeam assembly 304 to come to a rest position after all the material has entered weigh hopper 14.

By closing contacts S-T2, stepper network 202 is activated to energize impulse timer relay C-T which impulses stepper coil S-C to automatically advance wiper 162 through a self-interrupting action in the manner as previously described. With each discrete impulse of stepper coil S-C, wiper 162 will be advanced one step forward beginning from its "home" position at contact S21 and advancing first to contact S1 and then to contact S2 and so on in the manner previously described. With contacts D1–D4 inclusive closed and contacts D5–D20 inclusive open of digitizer 300, wiper 162 will be automatically advanced from contact S21 through contacts S1–S16 inclusive. When wiper 162 is advanced the next step to contact S17, thus reaching coincidence with the first shorted digitizer position represented by contacts D4 of digitizer 300, a circuit is completed for energizing relay R-C through closed contacts D4, wiper 162 and contacts S-T1.

By energizing relay R-C, the stepper network 202 is immediately de-activated by the opening of contacts R-C2 to interrupt the circuit to timer relay C-T and to stepper coil S-C. As a result the advancement of wiper 162 is arrested with wiper 162 remaining on contact S17 in the same manner as described in the previous embodiments.

Energization of relay R-C also closes contacts R-C1 to energize relay R-T. After short delay following energization of relay R-T, contacts R-T1 will close causing the discharge latch relay D-L to be energized to transfer contacts D-L2, D-L3, D-L4, D-L5 and D-L6 to opposite positions from that shown in the drawings. By opening contacts D-L2, the stepper advance network is locked out to insure that wiper 162 remains at its coincidence position on contact S17 before allowing the scale to discharge.

Closing of contacts D-L4 energizes relay T-T to impulse counter solenoid T-SD thereby advancing counter wheel 172 by a single count or digit as previously described to manifest a weight value of 1000 on counter 65. At this point in the operation, counter 65 now manifests a plural order digit which is a predetermined magnitude less than the actual weight of the load in weigh hopper 14 at which a balanced condition was secured by an amount equal to the digitizer range of digitizer 300, or, more particularly, the number of digitizer contacts in digitizer 300.

By closing contacts D-L4, the circuit for impulsing counter solenoid U-SD is condition for counting in the four pound overbalance. With wiper 162 still maintained at the position coinciding with the digitizer position marked by closed contacts D4, discharge air valve solenoid D-SD is energized as a result of closing contacts D-L3. This starts the removal of the 1024 draft from weigh hopper 14. When impulse relay T-T times out, contacts T-T2 are closed to complete a circuit for re-energizing time delay relay C-T to count in the overbalance of four pounds.

As a result, wiper 162, in the manner previously explained, is now advanced from its coincidence position on contact S17 toward its home position at contact S21, thus impulsing counter solenoid U-SD four times to advance counter wheel 178 by four digits. Thus, an addend of 4 is added to the augend of 1000 previously registered by the single impulse of solenoid T-SD to now manifest a sub-total of 1004 on counter 65.

As previously explained, upon the discharge of the first four pounds of material from hopper 14, contacts D4, D3, D2, and D1 will progressively open by the resulting movement of weighbeam 340. When contacts D1 open, relay F-C is de-energized to open contacts F-C2 and to close F-C1. With discharge gate 20 still open, however, discharge limit switch DG-LS1 remains open, thus assuring that feed gate solenoid FG-SD is not prematurely energized. By opening contacts F-C2, stabilizing time relay S-T is de-energized to open contacts S-T1 for de-energizing relay R-C. De-energization of relay R-C opens contacts R-C1 to de-energize relay R-T.

De-energization of relay R-T opens contacts R-T1 to de-energize the latching relay D-L. Contacts D-L2 to D-L6 inclusive, however, are all latched in position opposite to that shown in the drawings, thus permitting the de-energization of relay D-L without causing a change in the position of the contacts actuated thereby.

As a result of having closed contacts D-L5 by initially energizing latch relay D-L, empty latch relay E-L is energized to transfer contacts E-L1 to E-L4 inclusive to positions opposite to that shown in the drawings and to latch them in place. The opening of contacts E-L1 prevents feed gate solenoid FG-SD from being energized until the contacts of relay E-L are unlatched by energization of latch release relay E-U in the manner previously explained.

By de-energizing relay R-T, empty latch relay E-L is also de-energized along with discharge latch relay D-L. Contacts E-L1 to E-L4 inclusive, however, remain in their position opposite to that illustrated in the drawings since they are latched in place and can only be released by energization of empty latch release relay E-U. As result of opening discharge gate 20, discharge timer relay D-T is energized, and when this relay times out, after the draft is discharged, contacts D-T1 close. With contacts D-T1 and contacts W2 closed as a result of wiper 162 again reaching its home position at contacts S21, circuit is completed for energizing discharge latch release relay D-U.

By energizing discharge latch release relay D-U, contacts D-L2 to D-L6 inclusive are all unlatched, thus permitting these contacts to be transferred back to their respective positions illustrated in the drawing and accomplishing their respective functions described in the embodiment of FIGURES 10–13. As a result of energizing discharge latch relay D-U, contacts D-L3 are opened to de-energize discharge gate solenoid D-SD to close discharge gate 20.

With contact D-L6 now closed and with contact E-L3 still latched in closed position, a circuit is completed for energizing empty stabilizing timer relay Z-T. Following a sufficient time to allow the system to stabilize after discharge gate 20 is closed, relay Z-T times out to close contacts Z-T1, Z-T2, and Z-T3. With this operation, the system is now conditioned to detect the weight of any residue left in weigh hopper 14 after discharge gate 20 was closed.

For the purpose of describing the operation of the embodiment illustrated in FIGURES 14–18, it will be assumed that a residue of 8 pounds is left in weigh hopper 14 after discharge gate 20 is closed. Consequently, the weight value of the draft removed from weigh hopper 14 will be 1016 pounds of which 1004 pounds have already been manifested by counter 65.

With 8 pounds of residue remaining in weigh hopper 14 and with discharge gate 20 closed, weighbeam 340 will be displaced under the unbalancing force of counterweight 366 to its inoperative position on beam stop 370. Weighbeam 342 now moves from its inoperative position to balance the weight of the empty hopper 14. Since 8 pounds remain in weigh hopper 14, weighbeam 42 will be deflected in an overbalancing direction to progressively close contacts D1″–D8″ inclusive, thus manifesting the weight of the residue in weigh hopper 14 in the same manner as the overbalance was detected and manifested by digitizer 300.

By closing contact Z-T1 a circuit is completed for energizing relay X-C. This circuit may be traced from line 66 to contact T21, through wiper 400, through contacts Z-T1, through the operating coil of relay X-C to line 68. With contacts Z-T2 closed, the energization of relay X-C closes contacts X-C2 to complete a circuit for energizing stepper impulse timer relay 2C-T. As a result of energizing relay 2C-T, the stepper network 411 is activated to advance wiper 400 with a self-interrupting action starting from its home position at T21 in the manner previously described. With each impulse of stepper coil 2S-C through the operation of contacts 2S-C2 and contacts 2C-T1, wiper 400 is advanced from contact T21 first to contact T1 and then to contact T2 and so on.

With contacts D1″–D8″ of digitizer 302 closed, the circuit for energizing relay X-C is maintained as wiper 400 is advanced through contacts T1–T8 inclusive. When wiper 400 is advanced to contact T9, however, the circuit for energizing relay X-C is interrupted since contact T9 is connected to the first open set of contacts D9″ in digitizer bank D1″–D20″ of digitizer 302. As a result, as soon as wiper 400 reaches contact T9 coinciding with the first open position in the digitizer bank D1″–D20″, relay X-C is de-energized to open contacts X-C2.

By opening contacts X-C2, the circuit for energizing relay 2C-T and stepper coil 2S-C is interrupted to prevent further advancement of wiper 400 beyond contact T9. Consequently, wiper 400 will remain on contact T9 until stepper coil 2S-C is impulsed through another circuit in stepper network 411.

As a result of de-energizing relay X-C, contacts X-C1 will close to complete a circuit through contacts Z-T3 to energize residue timer relay X-T. Energization of relay X-T closes contacts X-T1 after a short time delay to complete a circuit for the residue latch release relay X-L.

By energizing residue latch relay X-L, contacts X-L1 to X-L5 inclusive are all transferred to positions opposite from that shown in the drawings and latched in place until residue latch release relay X-U is energized. The opening of contacts X-L1 locks out the stepper network circuit through contacts Z-T2 to insure that wiper 400 remains at its coincidence position on contact T9. By closing contacts X-L4, however, a new circuit for energizing relay 2C-T is completed to facilitate advancement of wiper 400 towards its home position at contact T21. Thus, timer relay 2C-T will be energized since contacts 2W1 are closed as a result of having advanced wiper 400 off its home position at contacts T21.

With wiper 400 having assumed a position displaced from its home position by a number of steps as determined by the digitizer position by digitizer 302 in detecting the weight of residue in weigh hopper 14, wiper 400 will now begin stepping toward its home position at contact T21 under the operation of timer relay 2C-T and stepper coil 2S-C in the manner previously described.

With each step of wiper 400 toward its home position at contact T21, units solenoid U-SD will be impulsed through the circuit established by the closing of contacts X-L3 and the intermittent closing of contacts 2S-C1 under the control of stepper coil 2S-C. Thus, the number of impulses imparted to solenoid U-SD and, consequently, the addend added to the augend will be equal to the difference between the number of contacts in digitizer bank D1″–D20″ of digitizer 302 and the weight value of residue in weigh hopper 14. Consequently, where 8 pounds of residue has remained in weigh hopper 14 after discharge gate 20 is closed, solenoid U-SD will be impulsed 12 times to add an addend of 12 to the augend of 1004, thus manifesting a total of 1016 pounds on counter 65.

If there was no residue present in weigh hopper 14 after discharge gate 20 is closed, a count of 20 would then be added to the plural order number of 1000. Thus, in the case of no residue, the 20 counts added by digitizer 302 and the 1000 count added by the discharge of the draft will be manifested to provide a weight record of material balanced by the 1020 pound counterweight. If there is a maximum residue, then no count will be added.

In view of the foregoing it will be appreciated that the manifestation of 1000 to initially represent the load balanced by the 1020 pound counterweight constitutes the difference between counterweight 366 and 20 pound range of digitizer 302 at empty balance. Thus, in view of the foregoing it is apparent that the count in for overbalance and for residue is accomplished entirely by addition without any subtraction whatever.

When wiper 400 again reaches its home position at contact T21, contacts 2W2 close under the operation of cam 418 to energize empty latch release relay E-U through closed contacts X-L5. Energization of latch release relay E-U transfers contacts E-L1 to E-L4 inclusive to the positions illustrated in the drawings. By closing contacts E-L4, residue latch release relay X-U is energized through the closed contacts X-L5 and 2W2 to unlatch contacts X-L1 to X-L5 inclusive for transfer back to the positions illustrated in the drawings. This operation of releasing the contacts X-L1 to X-L5 together with releasing contacts E-L1 to E-L4 inclusive conditions the system for the next feeding cycle in the manner described in the embodiment of FIGURES 10-13.

This invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In an automatic weighing system having a weighing apparatus for receiving and balancing a predetermined weight of material, a member capable of movement in response to feeding of material to said apparatus to detect and manifest the amount of any overbalance acting on said apparatus in excess of said predetermined weight, and means having a series of electrically independent contacts each having a fixed element and a coacting movable element, the movable ones of said elements being progressively and accumulatively actuatable to closed engaging position with the fixed elements in response to the overbalancing movement of said member with the number of actuated contacts in said series corresponding to the weight value of overbalance acting on said weighing apparatus.

2. In an automatic weighing system having a weighing apparatus for receiving and balancing a predetermined weight of material and including a member capable of analogous movement to indicate balanced and overbalanced conditions resulting from feeding material to said weighing apparatus, switch means under the control of said member and responsive to a change from a balanced to an overbalanced condition to progressively and accumulatively establish a predetermined number of separate current paths corresponding to the weight value of any overbalance in excess of said predetermined weight, and means for totalizing and exhibiting a digital value corresponding to the total number of current paths established.

3. In an automatic weighing system having a weighing apparatus for receiving and balancing a predetermined weight of material and including a member capable of analogous movement to indicate balanced and overbalanced conditions resulting from feeding to said weighing apparatus, switch means under the control of said member and responsive to a change from a balanced to an overbalanced condition to progressively establish a predetermined number of separate current paths concomitantly with the movement of said member and corresponding to the weight value of the overbalance in excess of said predetermined weight, means for discharging material from said weighing apparatus enabling said member to return toward said balanced condition to disestablish said current paths, and means for totalizing and exhibiting a digital value corresponding to the total number of current paths established while the material is being discharged from said weighing apparatus.

4. The automatic weighing system defined in claim 3 wherein said switch means comprises a digitizer having a series of contacts, disposed one in each of said current paths and an actuator bar connected to said member and operable to progressively and accumulatively actuate said contacts to complete said current paths in response to overbalancing movement of said member.

5. The automatic weighing apparatus defined in claim 3 comprising a counterweight supported from said member and cooperating with said member to balance said predetermined weight of material fed to said weighing apparatus.

6. The automatic weighing system defined in claim 3 comprising a cut-off device actuatable in response to the establishment of the first current path in said series to automatically interrupt the feeding of material to said weighing apparatus.

7. The automatic weighing system defined in claim 6 comprising means for automatically controlling the discharge of the material from said weighing apparatus and being operable to discharge the material received in said weighing apparatus following a predetermined time delay after the feeding of material is interrupted to allow sufficient time for said member to reach a stabilized position.

8. The automatic weighing system defined in claim 3 comprising means responsive to movement of said member for counting the number of drafts of material discharged from said weighing apparatus prior to the count in of any current paths established as a result of an overbalance in each draft discharged.

9. In an automatic weighing system having a weighing apparatus for receiving and balancing a predetermined weight of material and including a member capable of analogous movement to indicate balanced and overbalanced conditions resulting from feeding material to said weighing apparatus,
  (a) switch means having a series of contacts under the control of said member progressively actuatable in response to a change from balanced to unbalanced condition of said member to progressively establish a predetermined number of separate current paths concomitantly with the movement of said member,
  (b) the number of established current paths corresponding to the weight of overbalance received in said weighing apparatus in excess of said predetermined weight with the last current path established marking the position at which said member is stabilized,
  (c) feed cut-off means operable to automatically control the feed of material to said weighing apparatus and responsive to at least the first established current path to interrupt the feed of material to said weighing apparatus,
  (d) stepping switch means having a wiper,
  (e) control means activatable to advance said wiper with a self-interrupting action to positions electrically connected to said contacts by said current paths,
  (f) said wiper being advanced from one to the next of said positions in a direction opposite to that in which said contacts are progressively actuated,
  (g) means responsive to at least the first current path established to activate said control means for advancing said wiper,
  (h) discharge means operable to automatically control the discharge of material from said weighing apparatus, (i) totalizing means having individual totalizing elements disposed to exhibit a multi-digit number representative of weight, (j) means automatically responsive to a circuit established through said last established current path and said wiper when said wiper reaches the last established current path to de-activate said control means and thereby arrest movement of said wiper at the position coinciding with the last established current path, (k) means responsive to the circuit established through said wiper to actuate said discharge means for discharging material in said weighing apparatus and to actuate said totalizing means for entering a number corresponding to the value of said predetermined weight, (l) means responsive to the actuation of said totalizing means to re-activate said control means to restore said wiper to its original position to create a number of sequential impulses corresponding in number to the number of current paths established before discharge of the material in said weighing apparatus, and (m) means for transmitting said impulses to a predetermined order in said totalizing means to advance the totalizing element corresponding thereto by one digit for each transmitted impulse.

10. In an automatic bulk weighing system having a scale mechanism supporting a material receiving unit and embodying a weighbeam counterweighted to balance a predetermined weight of material fed to said material receiving unit, a digitizer connected directly to said weighbeam and governed thereby for digitally marking the stabilized overbalancing position thereof by a current path, said digitizer being operable to disestablish said current path in response to movement of said weighbeam towards a balanced portion, means for transmitting said marking as a series of electrical impulses representative of weight increments of the overbalance exceeding said predetermined weight after said current path is disestablished, and totalizing means under the control of said impulses for digitally exhibiting said overbalance.

11. In an automatic bulk weighing system having a material receiving means supported by a scale mechanism capable of balancing a predetermined weight of material fed to said material receiving means with only the highest order in said predetermined weight being a non-zero digit, means under the control of said scale mechanism for cyclically feeding and discharging successive discrete drafts of material with respect to said material receiving means wherein the weight of each draft is controlled by said scale mechanism and normally exceeds said predetermined weight by a predetermined overbalancing amount, totalizing means capable of performing additive operations and having totalizing elements exhibiting separate orders of a multi-digit number, means for counting the number of drafts discharged from said material receiving means and for independently advancing only that totalizing element corresponding to said non-zero digit in the number representing said predetermined weight, and means for separately advancing a predetermined one of said totalizing elements corresponding to the order in which said overbalancing amount is measured to additively enter the amount of overbalance with respect to the amount entered for said predetermined weight.

12. In an automatic bulk weighing system having a scale mechanism supporting a material receiving means and embodying a weighbeam counterweighted to balance a predetermined weight of material fed to said material receiving means and representable by a plural-order digit in which the highest order is the only non-zero digit, means under the control of said scale mechanism for cyclically feeding and discharging successive discrete drafts of material with respect to said material receiving means wherein the weight of each draft is controlled by said scale mechanism and normally exceeds said predetermined weight by a predetermined overbalancing amount, totalizing means having a plurality of totalizing elements advanceable by electrical impulses and arranged to exhibit separate orders in a multi-digit number with the order of a predetermined one of said elements corresponding to the highest order of said plural-order digit and being advanceable independently of the lower order elements, means governed by said scale mechanism for establishing and transmitting a single electrical impulse for each draft discharged to advance said predetermined one of said totalizer elements independently of the lower order totalizing elements, and means governed by said scale mechanism for establishing and transmitting a series of electrical impulses representing the amount of overbalance in each draft to advance at least the totalizing element corresponding to the order in which the overbalance is measured by a number of digits representing the amount of overbalance in additive relationship to the augend exhibited by said totalizing means.

13. In an automatic bulk weighing system having a weighing apparatus for receiving and balancing a predetermined weight of material, means under the control of said weighing apparatus to cyclically feed and discharge a draft of material with respect to said mechanism, totalizing means operable to perform additive operations and capable of exhibiting a multi-digit number representative of weight, and means automatically governed by said scale mechanism and being operable to actuate said totalizing means to cause said totalizer means to exhibit the actual weight value of said draft fed to said scale mechanism less the actual weight value of any residue remaining to act on said scale mechanism after said draft is discharged therefrom solely by the performance of additive operations.

14. In an automatic weighing system having a material receiving means supported by a weighing mechanism and means for feeding and discharging a draft of material with respect to said material receiving means, totalizing means capable of performing additive operations and operable to display digital information representative of weight, and means automatically governed by said weighing mechanism and being operatively connected to actuate said totalizing means to enter the actual weight value of the draft received by said load receiving means less the actual weight of any residue remaining in said load receiving means after the draft is discharged therefrom solely by the performance of additive operations.

15. In an automatic weighing system having a material receiving means and means for cyclically feeding and discharging a draft of material with respect to said material receiving means, result receiving counter means capable of performing additive operations, means for balancing a predetermined weight of material fed to said material receiving means and operatively connected to said result receiving counter means for actuating said result receiving counter means to enter a digital value representative of the weight of material at which said balanced condition is secured but being a constant predetermined magnitude less than predetermined weight of material at which the balanced condition is secured, means for checking the tare balance of said material receiving means after the discharge of the draft of material to detect the weight of any residue remaining to act on said material receiving means, and means for adding to said digital value the difference between the weight of residue and said predetermined magnitude to thereby provide a determination of the actual amount of material discharged from said material receiving means.

16. In an automatic weighing system having a weighing apparatus supporting a material receiving unit and including a weighbeam with a tare weight mounted on said weighbeam for balancing said material receiving unit, a counterweight removably mounted on said weighbeam for balancing a predetermined weight of material delivered to said material receiving unit, first means operatively connected to said weighbeam for detecting and digitizing the weight value of any overbalance acting on said material receiving unit in excess of said predetermined weight in response to the overbalancing movement of said weighbeam, and second means under the control of said first means and being operable to automatically remove said counterweight from said weighbeam to enable said first means to check the tare balance condition of said weighing apparatus for detecting and digitizing the weight value of any residue left in said material receiving unit after a draft of material is removed from said material receiving unit.

17. In an automatic weighing system having a weighing apparatus supporting a material receiving unit and including a weighbeam with a tare weight for balancing the material receiving unit, means for feeding and discharging a draft of material with respect to said material receiving unit, a counterweight removably mounted on said weighbeam to balance a predetermined weight of material fed to said material receiving unit, switch means under the control of said weighbeam and being operable in response to the overbalancing movement of said weighbeam to detect and digitize the weight value of any overbalance acting on said material receiving unit in excess of said predetermined weight, and means under the control of said switch means for removing said counterweight after the material in said material receiving unit is discharged to enable said switch means to detect and digitize the weight value of any residue left on said material receiving unit.

18. In an automatic weighing system having a weighing apparatus supporting a material receiving unit and including a weighbeam on which a tare weight is mounted for balancing said material receiving unit, means for cyclically feeding and discharging successive discrete drafts of material with respect to said material receiving unit, a counterweight removably mounted on said weighbeam for balancing a predetermined weight of material fed to said material receiving unit, switch means under the control of said weighbeam and responsive to overbalancing movement of said weighbeam to progressively establish a predetermined number of separate current paths corresponding to the weight value of material exceeding a balanced condition, means responsive to the discharge of each draft for momentarily removing said counterweight from said weighbeam prior to the feeding of the next draft to enable said switch means to cyclically respond to any overbalancing movement of said weighbeam with a loaded material receiving unit and with an unloaded material receiving unit to thereby detect and digitize the presence of any material in excess of said predetermined weight and of any residue left in said material receiving unit after the draft is discharged, means under the control of said switch means for transforming the number of current paths established for loaded and unloaded conditions into separately established manifestations and for incorporating said manifestations with the number of drafts discharged to digitally and accumulatively exhibit the weight value of the drafts discharged from said material receiving unit.

19. The automatic weighing system defined in claim 18 wherein said means for removing said counterweight comprises an electrically actuatable operator energizable by the establishment of at least one current path but only after a predetermined time delay following the initiation of the discharge of material from said material receiving unit.

20. The automatic weighing system defined in claim 19, comprising means for automatically de-energizing said operator after a pre-selected period of energization.

21. The automatic weighing system defined in claim 20, comprising means for preventing the feeding of material to said material receiving unit while said operator is energized.

22. In an automatic weighing system having a weighing apparatus supporting a material receiving unit and including a gross weighing beam and a tare beam with said gross weighing beam being weighted to balance said material receiving unit and a predetermined weight of material delivered to said material receiving unit and with said tare beam being weighted to balance only said material receiving unit, means for cyclically feeding and discharging a draft of material with respect to said material receiving unit, first and second digitizers respectively directly connected to said gross weighing beam and said tare beam to detect and digitize overbalancing movement of each of said beams to provide separate digital manifestations of the weight value of any material in excess of balanced conditions both for loaded and tare conditions, and means for combining the digitized manifestations of said digitizers with said predetermined weight to provide a digital representation of the weight value of the draft of material fed to said material receiving unit less the residue remaining therein after the draft is discharged.

23. In an automatic weighing system having a weighing apparatus supporting a material receiving unit and including a gross weighing beam and a tare beam with said gross weighing beam being weighted to balance said material receiving unit and a predetermined weight of material therein and with said tare beam being weighted to balance only said material receiving unit, means under the control of said weighing apparatus for cyclically feeding and discharging successive discrete drafts of material with respect to said material receiving unit wherein the weight of each draft normally exceeds said predetermined weight by a predetermined overbalancing amount, first switch means operatively connected to said gross weighing beam and responsive to overbalancing movement of said gross weighing beam to progressively establish a predetermined number of separate current paths digitally manifesting the amount of overbalance in excess of said predetermined weight, second switch means operatively connected to said tare beam and responsive to overbalancing movement of said tare beam to progressively establish a predetermined number of separate current paths to digitally manifest the amount of any residue left in said material receiving unit after each draft is discharged, and means for counting the number of drafts discharged and for combining the draft count with the digital manifestations of said first and second switch means to accumulatively provide a digital representation of the total weight of each draft discharged from said material receiving unit.

24. The automatic weighing system defined in claim 23, wherein each of said first and second switch means comprises a series of contacts disposed to complete their respective current paths and being progressively actuatable by their respective beams.

25. The automatic weighing system defined in claim 23, wherein said last mentioned means comprises a first stepping switch for said first switch means and operatively connected to step off the number of current paths established by said first switch means with means for transmitting the stepped off number of current paths as electrical impulses, totalizing means responsive to said electrical impulses for entering a digital value corresponding to the number of transmitted electrical impulses, a second stepping switch for said second switch means and operatively connected to step off the difference between the number of current paths established by said second switch means and a predetermined number wherein said predetermined number constitutes the total number of current paths establishable by said second switch means, and means for transmitting the stepped-off difference as electrical impulses to actuate said totalizing means.

26. In an automatic weighing system having a weighing apparatus supporting a material receiving unit, means under the control of said weighing apparatus for feeding a draft of material of predetermined weight to said material receiving unit, and means controlled by said weighing apparatus for discharging said draft from said material receiving unit, means including a totalizer for manifesting the weight of the draft fed to said material receiving unit, switch means under the control of said weighing apparatus and being operable to establish a series of separate current paths of predetermined maximum number, said switch means being responsive to the weight of residue remaining to act on said material receiving unit after the draft is discharged to establish a predetermined number of current paths in said series corresponding to the weight value of the residue, and means under the control of said switch means for counting in the difference between said maximum number of current paths and the number of established current paths and for adding said difference to a predetermined value to provide a digital manifestation of the weight of the draft less the amount of residue.

27. In an automatic weighing system having a weighing apparatus for receiving and balancing a predetermined weight of material and including a member capable of analogous movement to indicate balanced and overbalanced conditions resulting from feeding material to said weighing apparatus, switch means under the control of said member and being responsive to a change from balanced to an overbalanced condition to progressively establish a predetermined number of separate current paths concomitantly with the movement of said member and corresponding to the weight value of the overbalance in excess of said predetermined weight, and means for totalizing and exhibiting a digital value corresponding to the total number of current paths established, said switch means comprising a digitizer having a series of contacts disposed one in each of said current paths and an actuator bar connected to said member and operable to progressively actuate said contacts to complete said current paths in response to overbalancing movement of said member, said contacts being provided on flexible arms contained in a common plane and engageable by a surface on said actuator bar which is inclined at an acute angle with respect to said common plane.

28. In an automatic weighing system having a weighing apparatus for receiving and balancing a predetermined weight of material and including a member capable of analogous movement to indicate balanced and overbalanced conditions resulting from feeding material to said weighing apparatus, relay means energizable to discharge material from said apparatus, switch means under the control of said member and responsive to a change from balanced to overbalanced conditions to progressively establish a predetermined number of separate current paths corresponding to the weight of any overbalance in excess of said predetermined weight, and means responsive to the establishment of said first current path to establish an energizing circuit for said relay means through the last of the established ones of said current paths.

References Cited in the file of this patent

UNITED STATES PATENTS

| | | |
|---|---|---|
| 2,357,766 | Richardson | Sept. 5, 1944 |
| 2,418,576 | Conrad | April 8, 1947 |
| 2,434,177 | Richardson | Jan. 6, 1948 |